United States Patent
Spors et al.

(10) Patent No.: US 9,358,616 B2
(45) Date of Patent: Jun. 7, 2016

(54) DEVICE FOR CONNECTING TWO COMPONENTS

(75) Inventors: Benno Spors, Marbach (DE); Gerhard Stolz, Ingersheim (DE); Wolfgang Bierl, Gueglingen (DE); Waldemar Dubs, Ludwigsburg (DE)

(73) Assignee: KOMET GROUP GMBH, Besigheim (DE)

( * ) Notice: Subject to any disclaimer, the term of this patent is extended or adjusted under 35 U.S.C. 154(b) by 526 days.

(21) Appl. No.: 13/514,387

(22) PCT Filed: Feb. 18, 2011

(86) PCT No.: PCT/EP2011/052411
§ 371 (c)(1),
(2), (4) Date: Jun. 7, 2012

(87) PCT Pub. No.: WO2011/107354
PCT Pub. Date: Sep. 9, 2011

(65) Prior Publication Data
US 2012/0243934 A1  Sep. 27, 2012

(30) Foreign Application Priority Data

Mar. 2, 2010 (DE) .......................... 10 2010 002 491
Aug. 26, 2010 (DE) .......................... 10 2010 039 793

(51) Int. Cl.
B23B 31/107 (2006.01)

(52) U.S. Cl.
CPC ......... *B23B 31/1077* (2013.01); *Y10T 403/589* (2015.01); *Y10T 403/7037* (2015.01); *Y10T 403/7041* (2015.01); *Y10T 403/76* (2015.01)

(58) Field of Classification Search
CPC .................................................. B23B 31/1077
USPC ........... 403/360–362, 376, 378, 379.2–379.4, 403/379.6, 409.1; 279/28, 83; 408/239 R; 409/232, 234
See application file for complete search history.

(56) References Cited

U.S. PATENT DOCUMENTS 4,615,244 A    10/1986  Reiter et al.
4,617,848 A *  10/1986  Eckle et al. ............... 408/239 R
(Continued)

FOREIGN PATENT DOCUMENTS

DE      36 32 045 C1    11/1987
DE      39 08 500 A1    10/1989
(Continued)

OTHER PUBLICATIONS
German Patent Office Search Report issued in Application No. 10 2010 002 491.0 dated Oct. 18, 2010 with English translation of p. 2 (5 pages).

*Primary Examiner* — Josh Skroupa
(74) *Attorney, Agent, or Firm* — Flynn, Thiel, Boutell & Tanis, P.C.

(57) ABSTRACT

A device for connecting two components (10, 14), for example two tool parts. The first component (10) has a cylindrical locating pin (12) and an annular face (22) projecting radially beyond this locating pin (12), while the second component (14) has a cylindrical locating bore (16) for receiving the locating pin (12) and an annular face (24) surrounding the locating bore (16). Also provided is a clamping mechanism (18), which ensures during the clamping operation that the locating pin (12) is drawn into the locating bore (16) and at the same time the annular faces (22, 24) are pressed against one another.

59 Claims, 24 Drawing Sheets

(56) References Cited

U.S. PATENT DOCUMENTS

| | | | |
|---|---|---|---|
| 4,755,077 A | 7/1988 | Eckle | |
| 4,797,041 A * | 1/1989 | Glaser | 409/232 |
| 4,813,829 A | 3/1989 | Koppelmann | |
| 4,895,474 A * | 1/1990 | Eckle | 403/362 |
| 4,913,607 A | 4/1990 | von Haas | |
| 4,976,574 A | 12/1990 | Muendlein et al. | |
| 4,979,845 A * | 12/1990 | Scheer et al. | 403/379.4 |
| 5,137,401 A | 8/1992 | Muendlein et al. | |
| 5,257,884 A * | 11/1993 | Stolz et al. | 409/232 |
| 6,902,347 B2 | 6/2005 | Stolz et al. | |
| 7,066,693 B2 | 6/2006 | Baxivanelis et al. | |
| 2003/0138303 A1 | 7/2003 | Baxivanelis et al. | |
| 2004/0047680 A1 | 3/2004 | Stolz et al. | |
| 2006/0042707 A1 | 3/2006 | Sugimura et al. | |
| 2006/0207423 A1* | 9/2006 | Weber et al. | 92/169.1 |
| 2009/0256318 A1 | 10/2009 | Stolz | |

FOREIGN PATENT DOCUMENTS

| | | | | |
|---|---|---|---|---|
| DE | 100 04 895 A1 | 8/2001 | | |
| DE | 10 2006 043 733 A1 | 3/2007 | | |
| DE | 20 2008 007 199 U1 | 7/2009 | | |
| EP | 123220 | * 10/1984 | | B23B 31/04 |
| EP | 0 155 539 A1 | 9/1985 | | |
| EP | 0 295 315 A1 | 12/1988 | | |
| EP | 0 547 049 B1 | 6/1993 | | |
| EP | 0 633 039 A1 | 1/1995 | | |
| EP | 1 343 602 B1 | 9/2003 | | |
| GB | 2 094 191 A | 9/1982 | | |
| GB | 2154481 | * 9/1985 | | B23B 31/00 |
| WO | WO 02/051572 A1 | 7/2002 | | |

* cited by examiner

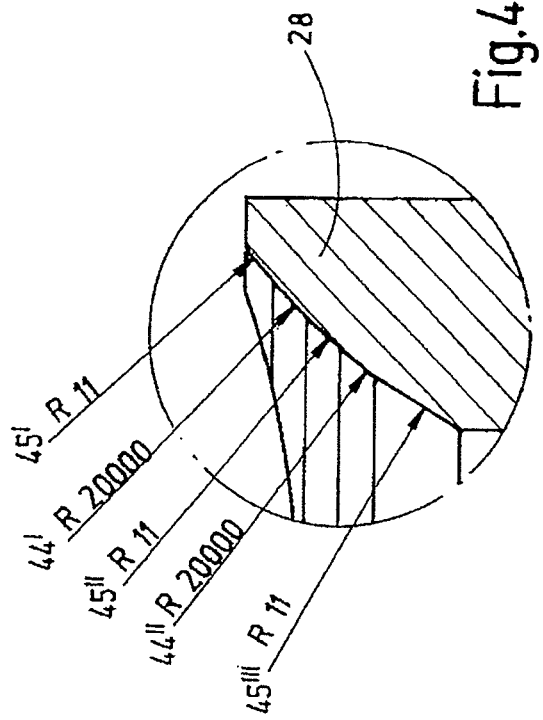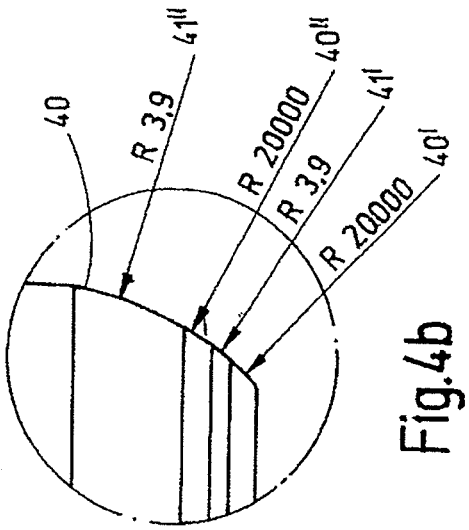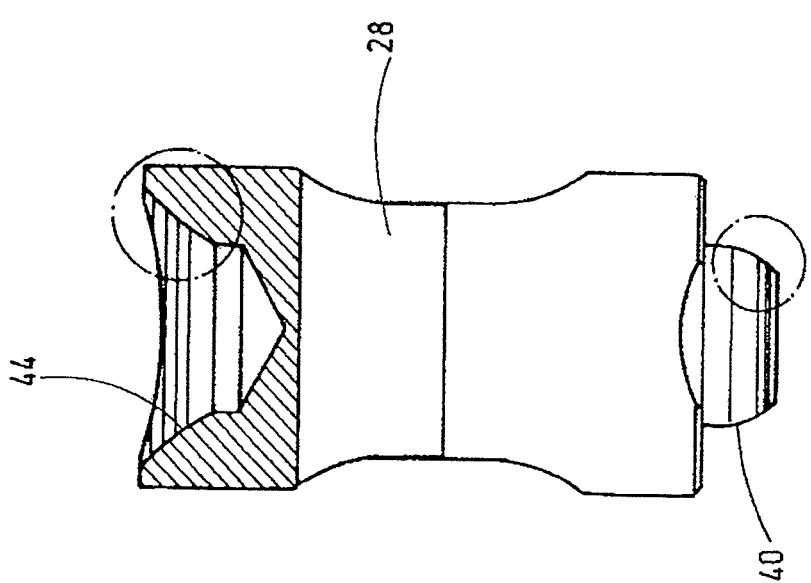

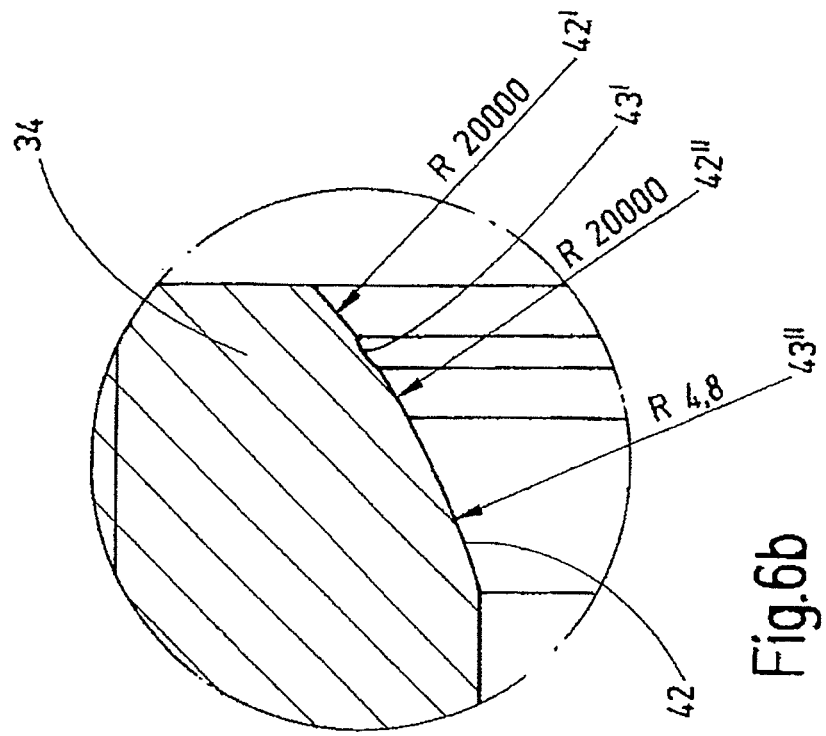
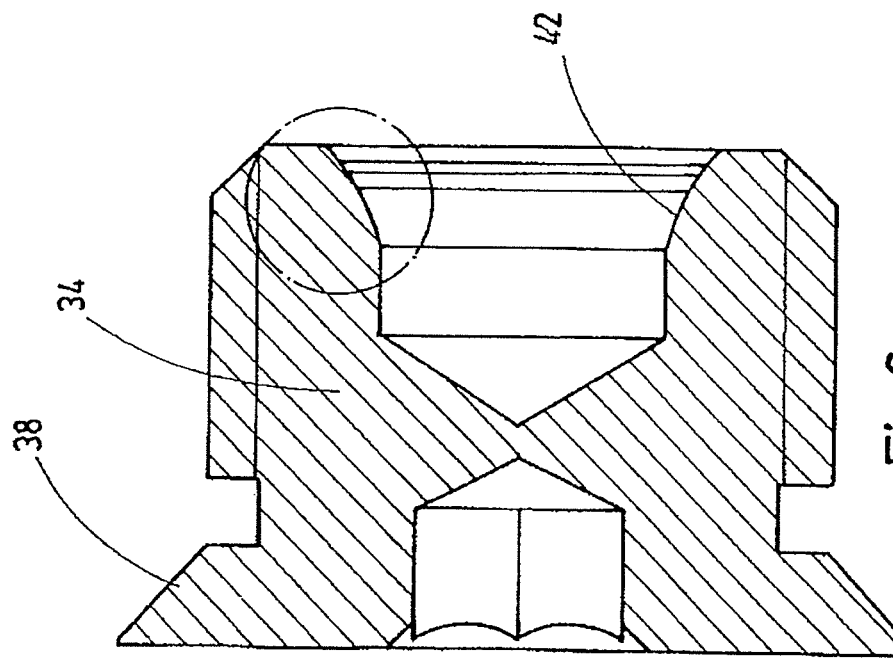

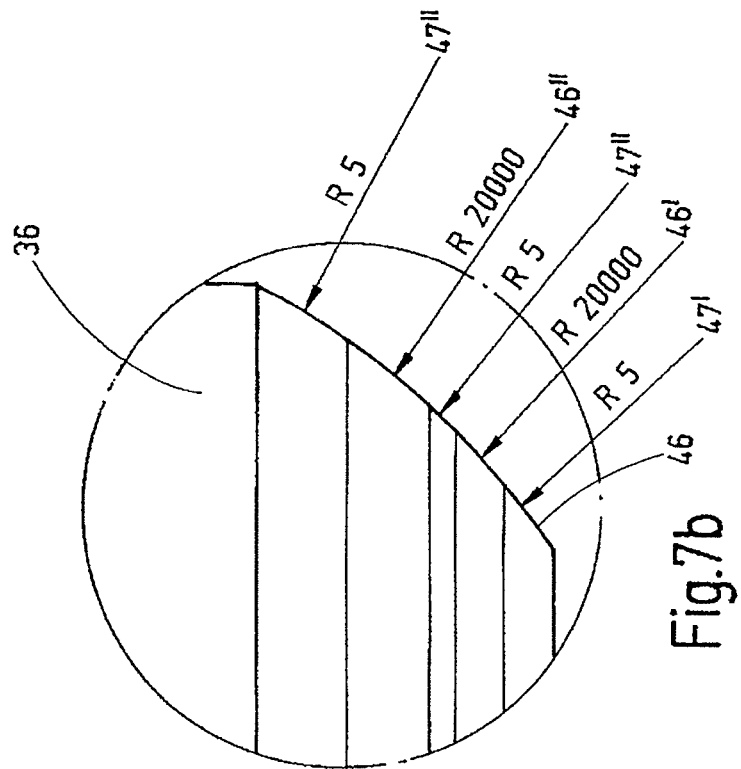
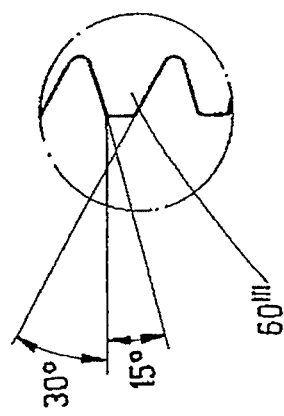
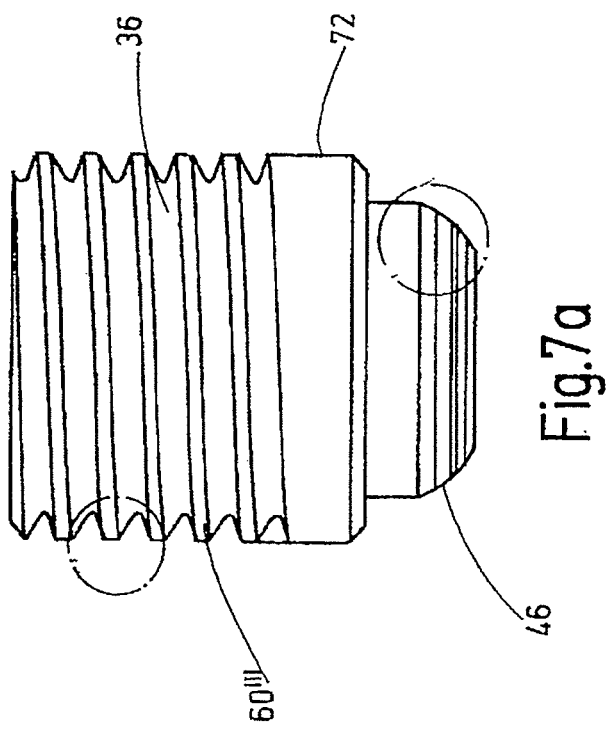

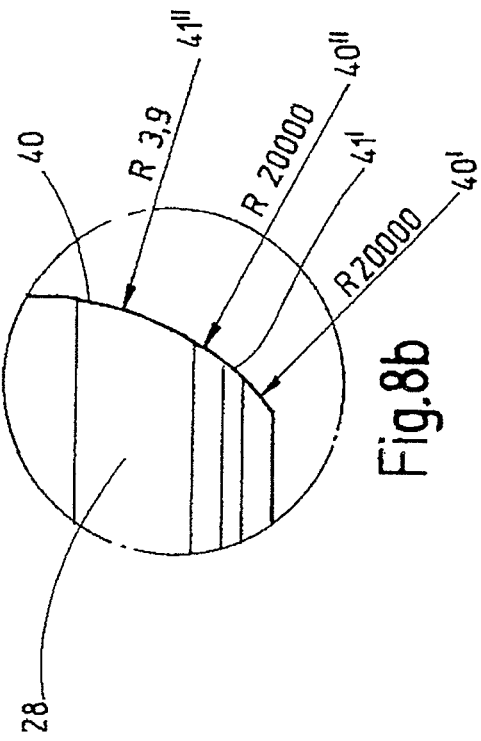
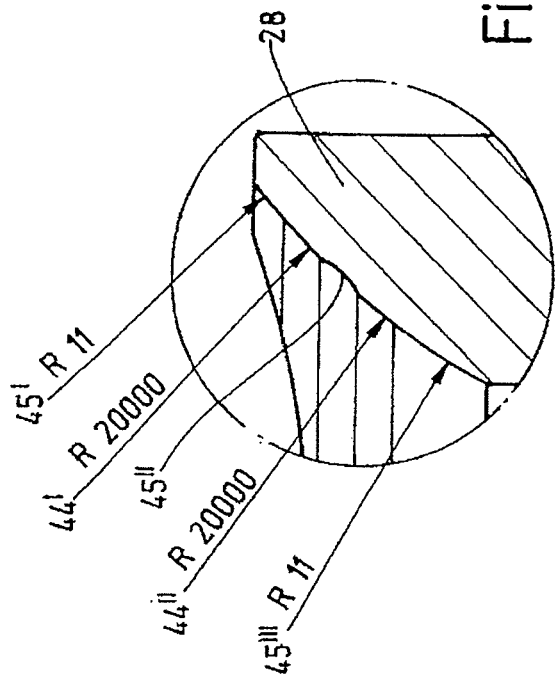
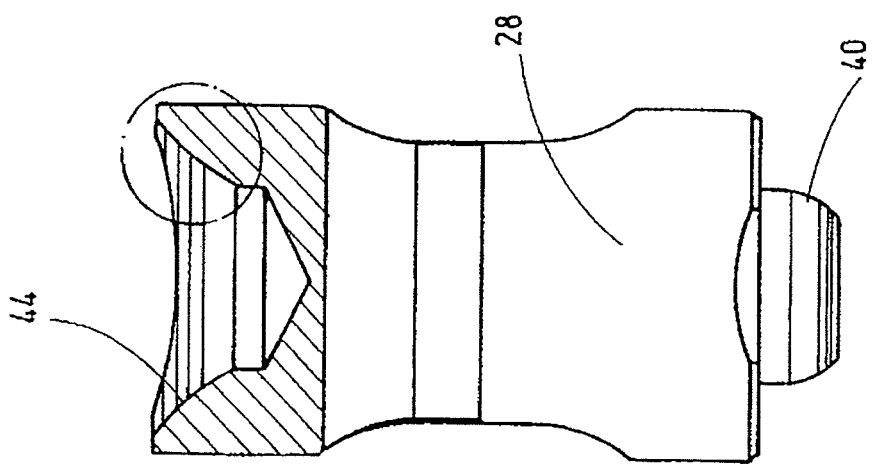

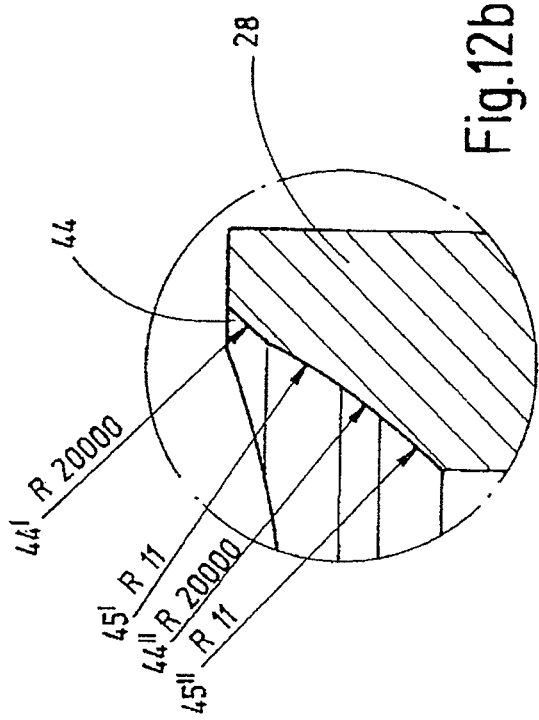
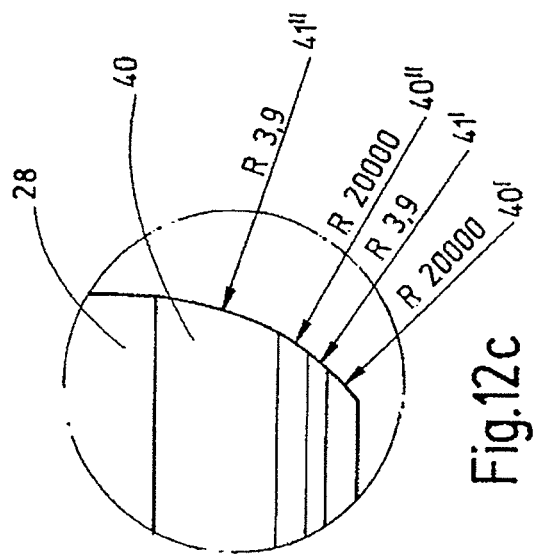
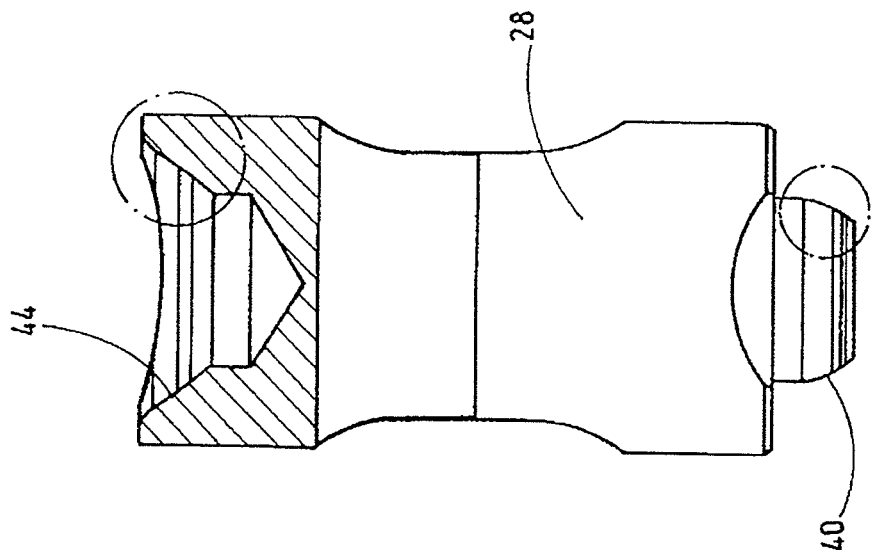

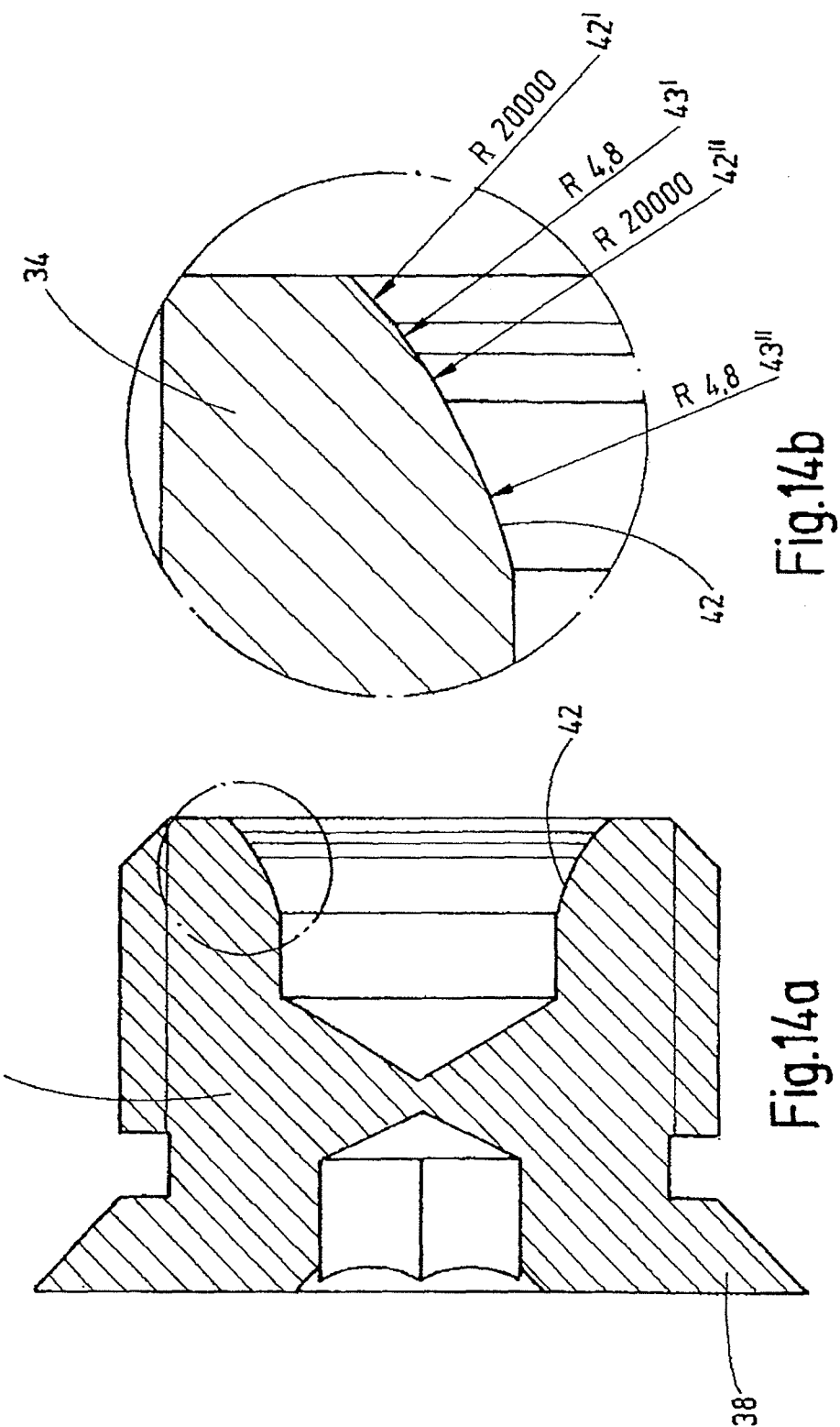

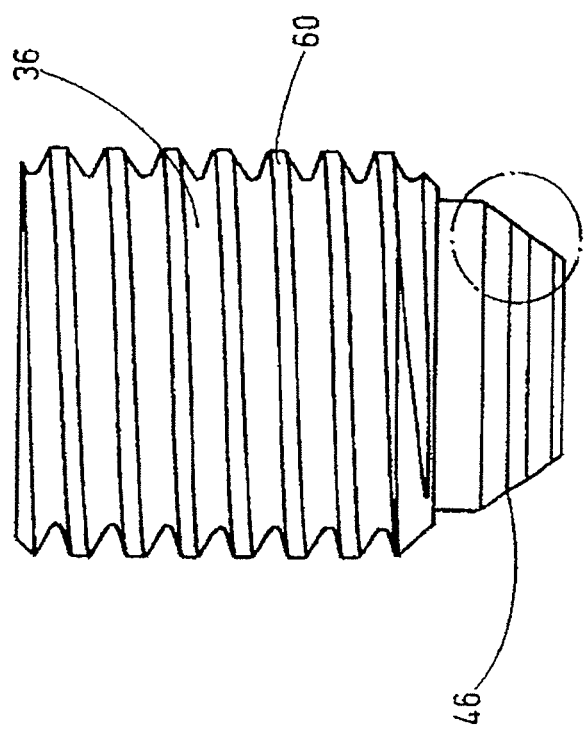
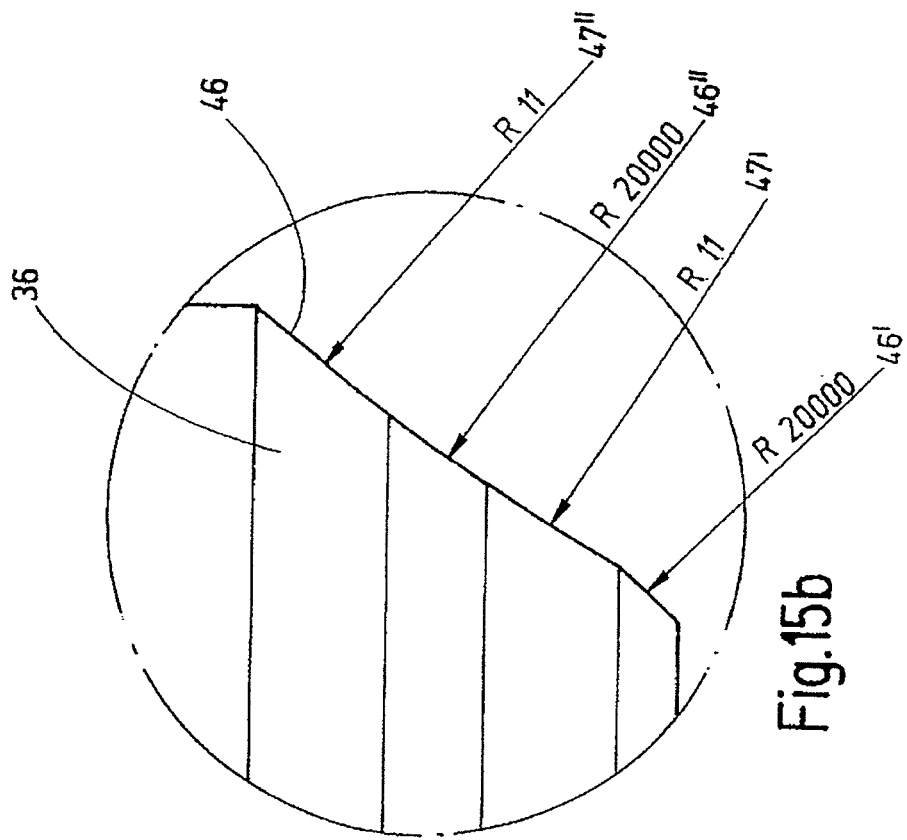
Fig.15a
Fig.15b

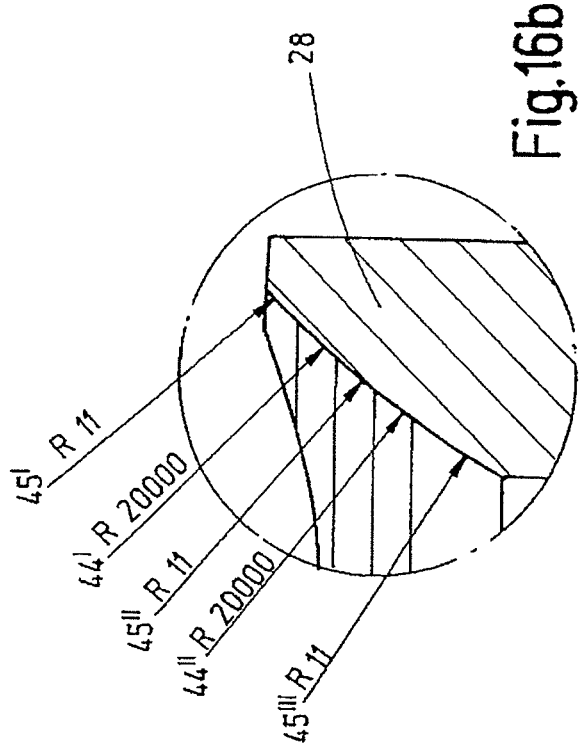
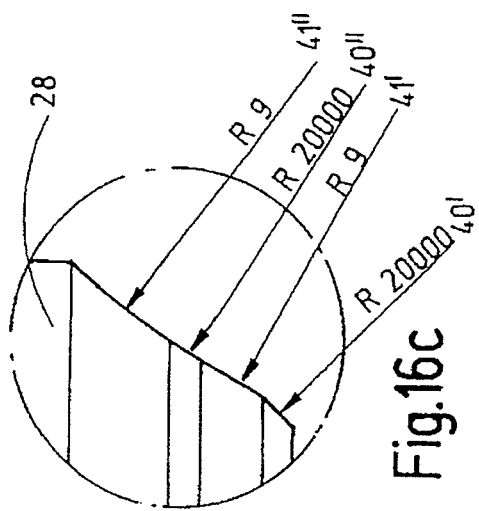
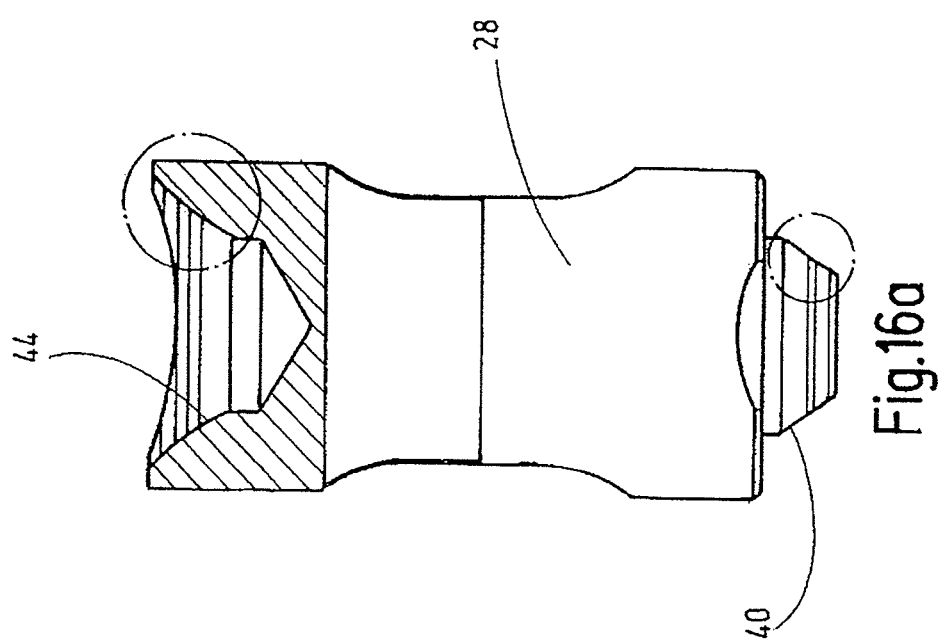

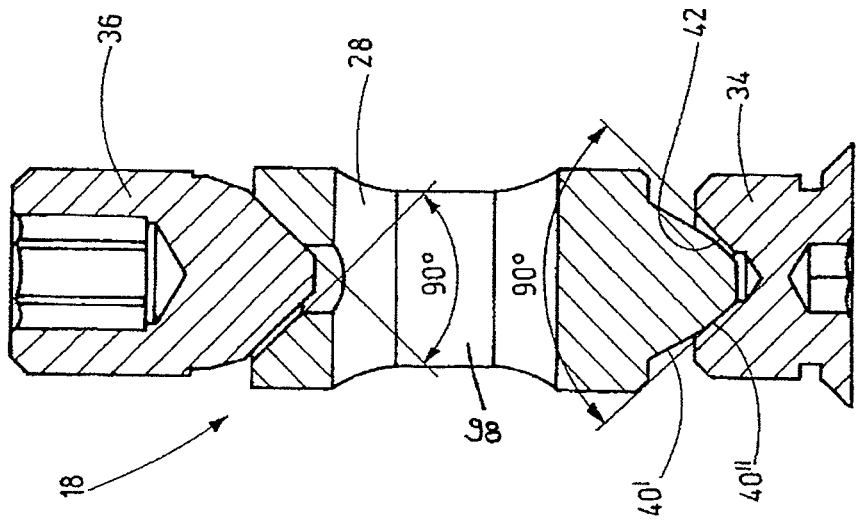
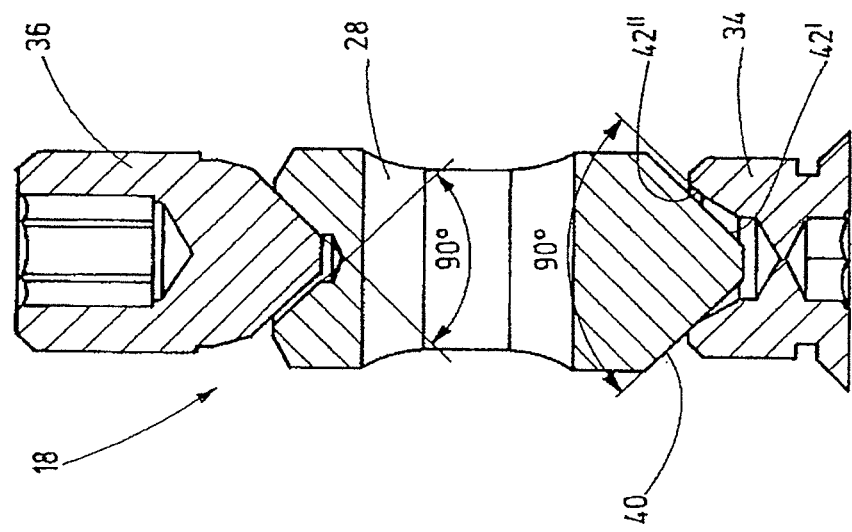
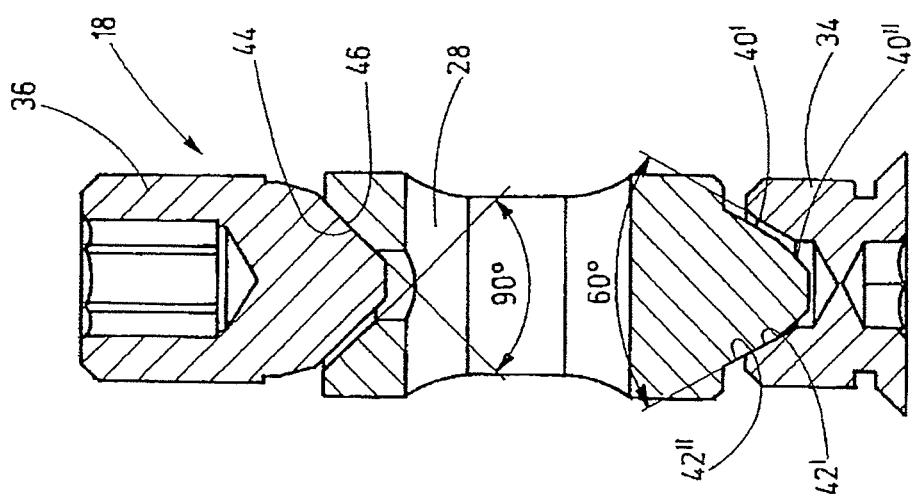

DEVICE FOR CONNECTING TWO COMPONENTS

CROSS REFERENCE TO RELATED APPLICATION

This is the National Stage of International Application No. PCT/EP2011/052411, filed Feb. 18, 2011 which claims the priority of German Application No. 10 2010 002 491.0, filed Mar. 2, 2010 and German Application No. 10 2010 039 73.8, filed Aug. 26, 2010, the disclosure of which are hereby incorporated by reference in its entirety into this application.

The invention relates to a device for connecting two components, in particular two tool parts, having a cylindrical locating pin, which is arranged on the first component, and having a radially projecting annular face, which surrounds the locating pin at the root thereof, having a cylindrical locating bore, which is arranged in the second component and is intended for receiving the locating pin, and having an annular face, which surrounds the locating bore at the periphery thereof, having a clamping bolt, which is movably guided with a cylindrical guiding surface in a transverse bore of the locating pin, has at its extreme ends an inner cone or outer cone concentric to the guiding surface and is of a length that is less than the diameter of the locating pin in the region of the transverse bore, and having two holding elements, which are inserted in radial bores that lie diametrically opposite one another in the region of the locating bore and are preferably provided with an internal thread, have an outer cone or inner cone facing the interior of the locating bore and complementing the inner or outer cone of the clamping bolt and, during the clamping operation, can be clamped in a wedge-like manner with the clamping bolt, the inner and outer cones that complement one another having in pairs an axial offset that has the effect during the clamping operation of drawing the locating pin into the locating bore and pressing the annular faces against one another.

In the case of a known device of this type (EP-0 547 049 B1), the one end of the clamping bolt is formed as an inner cone and the other end is formed as an outer cone. The one holding element is formed as a stop screw, which is fixed in the second component and has an inner cone acting together with the outer cone of the clamping bolt, while the other holding element is formed as a movement screw, which has an outer cone engaging in the inner cone of the clamping bolt. Like the clamping bolt, the movement screw and the stop screw have on their inner cone and outer cone the same cone angle of about 90°. If abutment occurs when the movement screw is screwed in, the forces initiated as a result initially occur on the side of the movement screw. The clamping bolt is thereby first pressed on the movement screw side against the base of the transverse bore that is facing the end of the locating pin in such a way that the locating pin is drawn into the locating bore. Directly thereafter, this also takes place when the clamping pin outer cone runs onto the inner cone of the opposing stop screw. As soon as a certain clamping effect has occurred, the conversion of the radial forces into an axial component pressing the annular faces of the first and second component against one another takes place. However, part of the torque introduced by way of the movement screw is used for overcoming the friction of the clamping pin in the transverse bore. This means that the annular faces on the side of the movement screw are pressed against one another with a greater axial force than on the side of the stop screw.

In order to improve this disadvantage of the known device to the extent that the torque produced within the clamping device during the clamping operation is converted better and more uniformly, seen over the circumference, into clamping of the planar faces, it has already been proposed (EP-1 343 602 B1) that the inner and outer cones that complement one another on the side of the stop screw have a smaller cone angle than on the side of the movement screw. Thus, the cone angles on the side of the stop screw are preferably between 40° and 80°, while on the side of the movement screw they are between 70° and 120°. During the clamping operation, the inner and outer cones engaging in one another act as a kind of wedge mechanism, by way of which the radial movement of the movement screw and of the clamping bolt is partially converted into axial planar face clamping. As a result of the different cone angles proposed there on the side of the movement screw and the stop screw, axial force components of different percentages are obtained. With the smaller cone angle on the side of the stop screw, an increased axial component is obtained, and consequently a compensation for the frictional losses of the clamping bolt within the transverse bore.

The implementation of this principle is made more difficult in particular by the fact that there is no upward and downward compatibility between the coupling system that is widely used in practice, with the same cone angles of about 90° on the side of the movement screw and on the side of the stop screw, and the technically improved coupling system with different cone angles, that would make it possible for components to be interchanged.

The invention is based on the object of avoiding this disadvantage.

To achieve this object, the combinations of features specified in the present claims are proposed. Advantageous embodiments and developments of the invention are provided by the dependent claims.

The invention is based in particular on the realization that, in the region of abutment, the complementing, mutually facing outer and inner cones are not pressed against one another over their entire axial length, but only over part of the conical face. This results in the basic concept of the invention, that the inner cone and/or the outer cone of the clamping bolt and/or of at least one of the holding elements can be subdivided in the axial direction into two substantially frustoconical contact portions arranged coaxially at a distance from one another, which during the clamping operation can be effective either individually or at one and the same time.

According to the invention, this gives rise to various combinational possibilities, which lead to the compatibility of said coupling systems with the same or different cone angles on the movement screw side and stop screw side.

A first variant of the invention provides that the inner cone and/or the outer cone of the clamping bolt have two substantially frustoconical contact portions arranged coaxially at an axial distance from one another, which for their part expediently have different cone angles.

This measure allows compatibility to be established with a first group of holding elements, the outer cone or inner cone of which has two substantially frustoconical contact portions with different cone angles arranged at an axial distance from one another, only one of which complements one of the contact portions of the neighboring inner cone or outer cone of the clamping bolt.

Furthermore, compatibility is possible with a second group of holding elements, the outer cone or inner cone of which has only one frustoconical contact portion, which complements one of the contact portions of the neighboring inner cone or outer cone of the clamping bolt.

A second variant of the invention provides that the outer cone or the inner cone of at least one of the holding elements has two substantially frustoconical contact portions arranged coaxially at an axial distance from one another, which expediently have different cone angles. Such an arrangement ensures compatibility with a first group of clamping bolts, the inner cone and/or outer cone of which has two substantially frustoconical contact portions with different cone angles arranged coaxially at an axial distance from one another, of which only one in each case complements one of the contact portions of the neighboring outer cone or inner cone of one of the holding elements. On the other hand, there is compatibility with a second group of clamping bolts, the inner cone and/or outer cone of which has only one substantially frustoconical contact portion, which complements one of the contact portions of the neighboring outer cone or inner cone of one of the holding elements.

In the case of all the configurational variants of the aforementioned type, with which compatibility is important, the contact portions, arranged at an axial distance from one another, of the clamping bolt and of the holding elements have a cone angle that becomes greater toward the respectively free end face.

In principle, however, it is also possible to clamp the contact portions, arranged at an axial distance from one another, of the outer and inner cones to one another at one and the same time and in pairs. In this case, it is not a matter of the compatibility between the different clamping systems but a matter of producing a reliable clamping connection with two contact regions arranged at an axial distance from one another.

A further preferred embodiment of the invention provides that the contact portions of the clamping bolt and/or of the holding elements have a preferably slightly curved lateral surface in the axial direction. The lateral surface of the contact portions preferably has a radius of curvature of 4 mm to 50 000 mm. In the case of compatibility, the contact portions of the contact faces coming into contact with one another in pairs are convexly curved in the axial direction. In special cases, however, a pairing of convex and concave contact portions is also conceivable.

A further preferred embodiment of the invention provides that the contact portions of the clamping bolt and of the holding elements are delimited at the surrounding peripheries thereof by in each case a substantially frustoconical peripheral portion. The peripheral portions may in this case have a lateral surface that is crowned or curved in a flute-like manner in the axial direction. The radius of curvature of the peripheral portions is expediently less than that of the contact portion and is advantageously between 0.05 mm and 20 mm. A further preferred embodiment of the invention provides that one of the holding elements is formed as a stop screw that is placed against the second component and the other holding element is formed as a movement screw that can be actuated during the clamping operation, and that the frustoconical contact portions complementing one another have a smaller cone angle on the side of the stop screw than on the side of the movement screw.

Tests have shown that the outer and inner cones in the region of the movement screw are subject to greater wear than on the side of the stop screw. It has therefore proven to be particularly expedient if the holding element that is formed as a movement screw has an outer cone and the clamping bolt on the side of the movement screw has an inner cone complementing said outer cone, with in each case only one frustoconical contact portion. The cone angle at this point is expediently 90°, so that on the side of the movement screw there is conformity with the conventional ABS system. In order to be able to use the properties of the invention in this case too, it is of particular advantage if the holding element that is formed as a stop screw has an inner cone and the clamping bolt on the side of the stop screw has an outer cone, with in each case two frustoconical contact portions arranged at an axial distance from one another, with different cone angles. In this case, only one of the contact portions of the inner cone of the stop screw complements one of the contact portions of the neighboring outer cone of the clamping bolt. In the respective case of another contact portion, there is conformity with the conventional ABS coupling system.

According to one advantageous or alternative embodiment of the invention, the movement screw has a sawtooth thread with cylindrical guiding portions. This achieves an improvement in the guiding properties both of the movement screw and of the clamping bolt, and consequently achieves improved repeat accuracy during the clamping operation. In the case of the sawtooth thread, it is regarded as particularly advantageous if the supporting flank of the sawtooth thread has with respect to a radial plane a flank angle of 5° to 15°, while the opposing flank, facing the center of the tool, has a flank angle of 25° to 35°.

A further improvement in the repeat accuracy can be achieved if the clamping bolt and/or the holding elements have, at least in the region of the inner and/or outer cones, a friction-reducing coating or surface finish.

To improve the centering accuracy, according to a further advantageous or alternative embodiment of the invention, it is proposed that a sealing ring, provided with an axial aperture and a centering ring, supported on the inner wall of the locating bore, are arranged between the end face of the locating pin and the bottom of the locating bore. The centering ring and the sealing ring may either be connected to one another in one piece or be formed as two parts.

BRIEF DESCRIPTION OF THE DRAWINGS

The invention is explained in more detail below on the basis of the exemplary embodiments that are schematically represented in the drawing, in which:

FIGS. 2a and b show a longitudinal section through the holding element of the tool coupling as shown in FIG. 1 that is formed as a stop screw or conical screw and show an enlarged detail from the region of the inner cone of FIG. 2a;

FIGS. 3a and b show a side view of a holding element of the tool coupling as shown in FIG. 1 that is formed as a movement screw or clamping screw, with a sawtooth thread, and show a detail from the region of the outer cone of FIG. 3a;

FIGS. 4a to c show a side view of the clamping bolt or pendulum bolt of the coupling device as shown in FIG. 1, in a partially sectional representation, and show two views of the details of the outer cone and the inner cone of FIG. 4a;

FIGS. 6a and b show a longitudinal section through the holding element of the tool coupling as shown in FIG. 5 that is formed as a stop screw or conical screw, and show an enlarged detail from the region of the inner cone of FIG. 6a;

FIGS. 7a to c show a side view of the holding element of the tool coupling as shown in FIG. 5 that is formed as a movement screw or clamping screw, with two views of the details from the region of the outer cone and the thread of FIG. 7a;

FIGS. 8a to c show a side view of the clamping bolt or conical bolt of the tool coupling as shown in FIG. 5, with two enlarged details from the region of the outer cone and the inner cone of FIG. 8a;

FIGS. 11a to c show a side view of the holding element of the tool coupling as shown in FIG. 9 that is formed as a movement screw or clamping screw, with a sawtooth thread, and show enlarged details from the region of the outer cone and the thread of FIG. 11a;

FIGS. 12a to c show a side view of a clamping bolt or pendulum bolt of the tool coupling as shown in FIG. 9, in a partially sectional representation, and show two views of details from the region of the inner cone or outer cone of FIG. 12a;

FIGS. 14a and b show a longitudinal section through the holding elements of the tool coupling according to FIG. 13 that is formed as a stop screw or conical screw and show an enlarged detail from FIG. 14a;

FIGS. 15a and b show a side view of the holding element of the tool coupling as shown in FIG. 13 that is formed as a movement screw or clamping screw and show an enlarged detail from the region of the outer cone of FIG. 15a;

FIGS. 16a to c show a side view of the clamping bolt or pendulum bolt of the tool coupling as shown in FIG. 13 and show two enlarged details from the region of the inner cone and the outer cone of FIG. 16a;

FIGS. 17a to 17c show a modified exemplary embodiment of a clamping mechanism for a tool coupling corresponding to FIG. 1 in a sectional representation, in three compatible structural forms;

FIG. 20c shows a section along the sectional line C-C of FIG. 20a;

Figure 1:
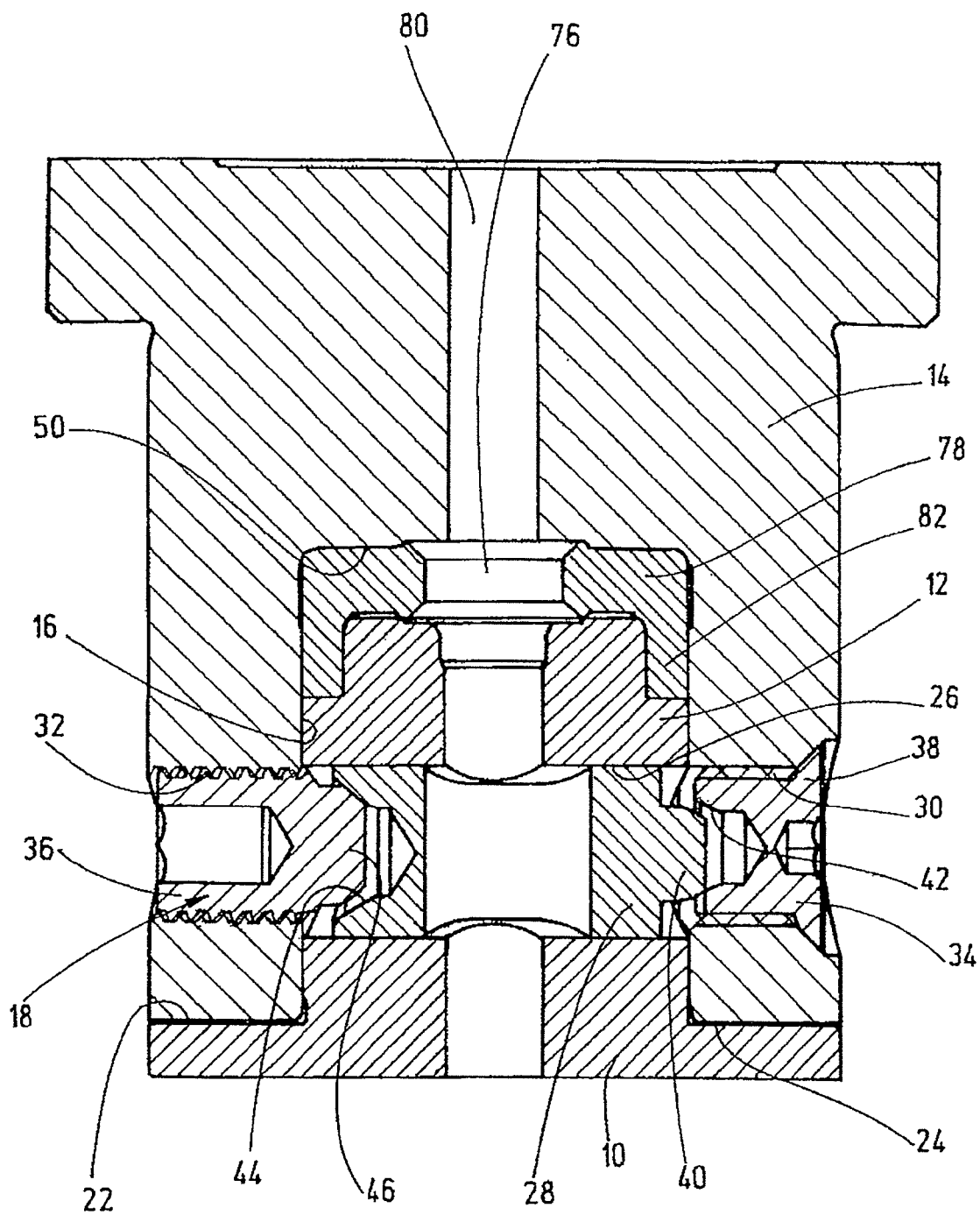
FIG. 1 shows a longitudinal section through the tool coupling with planar face clamping.

The connecting devices represented in the drawing serve for the detachable coupling of components. "Components." are intended to be understood above and below as meaning primarily tool parts which contain either a locating pin or a locating bore, that is to say, in particular, tool heads, tool shanks, adapter parts or intermediate elements, as well as extending and reducing parts, adjusting heads, spindle ancillary flanges and possibly a machine spindle.

The connecting device shown in FIG. 1 is substantially composed of a locating pin 12, which projects axially beyond a first component 10, a locating bore 16, which is arranged in a second component 14, and a clamping mechanism 18 for the inward drawing of the locating pin 12 into the locating bore 16 and for producing planar face clamping between the annular face 22 of the first component 10 that surrounds the locating pin 12 and the annular face 24 of the second component 14 that delimits the locating bore 16.

The clamping mechanism 18 includes a clamping bolt 28, which is arranged movably in a transverse bore 26 of the locating pin 12, and two bolding elements 34, 36, which are inserted in radial bores 30, 32 of the second component 14 and lie diametrically opposite to one another. In practice, the clamping bolt 28 is often also referred to as a pendulum bolt. The holding element 34 as shown in FIGS. 1 and 2 is formed as a stop screw fixed with its countersunk head 38 on the second component 14, while the holding elements 36 forms a movement screw.

Figure 19A:
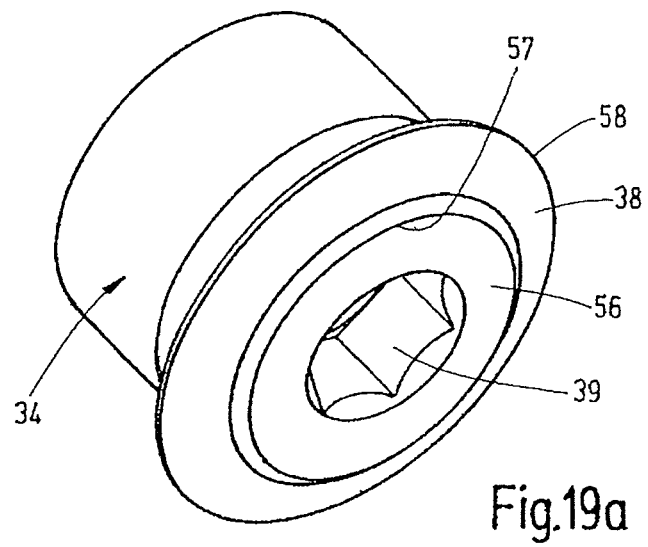
FIGS. 19a to c show a diagrammatic view, a side view and a plan view of a further embodiment of the holding element formed as a stop screw.
Figure 19B:
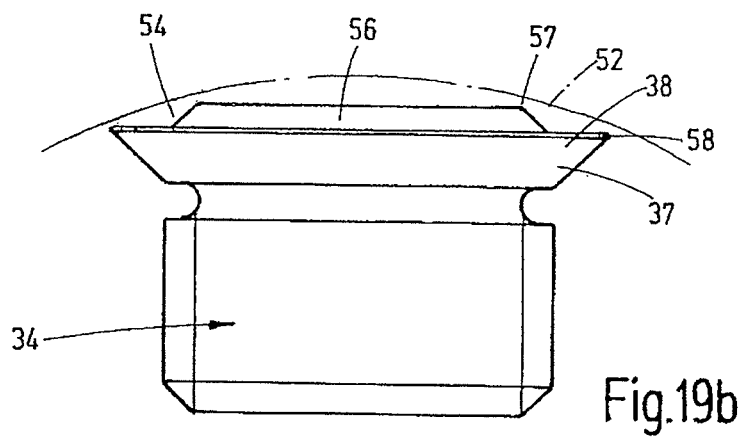
Figure 19C:
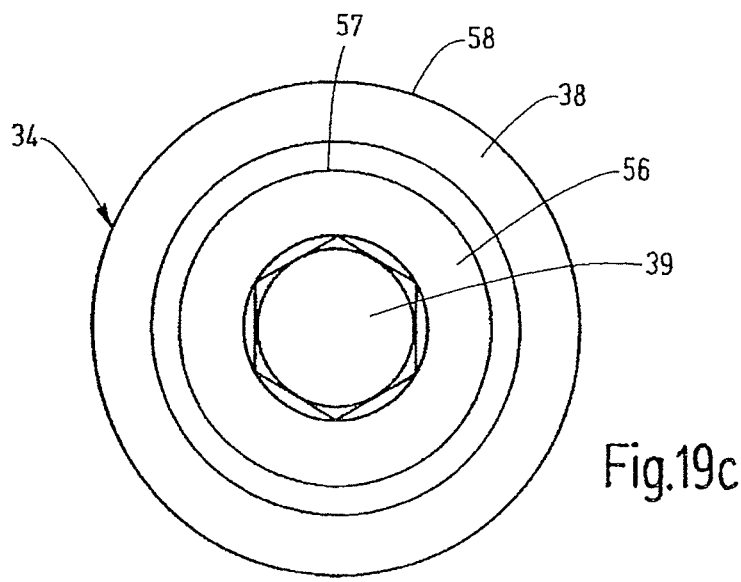

In the case of the exemplary embodiment shown in FIG. 1, in the assembled state the stop screw 34 abuts with a stop cone 37 of its countersunk head 38 against a corresponding inner cone of the second component 14 in such a way that some clearance 54 still remains on the outside up to the cylindrical lateral circumference 52 of the second component 14. In order to increase the strength of the stop screw 34 and to increase the engagement of a wrench in the polygonal socket 39 of the countersunk head 38, this clearance 54 offers the possibility of providing the outside of the countersunk head 38 with an elevation 56, the highest point 57 of which in the assembled state is arranged within the cylindrical lateral circumference 52 of the second component 14. In the case of the exemplary embodiment shown in FIGS. 19a to c, such an elevation 56 that is arranged concentrically in relation to the outer periphery 58 and has a frustoconical shape is provided.

The clamping bolt 28 engages with its outer cone 40 in an inner cone 42 of the neighboring stop screw 34 and has at its end opposite from the outer cone 40 an inner cone 44 for receiving an outer cone 46 formed on the movement screw 36.

To produce a connection between the two components 10, 14, firstly, with the movement screw 36 unscrewed, the locating pin 12 is loosely inserted into the locating bore 16 of the second component 14 until the annular faces 22, 24 abut. As the movement screw 36 is subsequently screwed into the internal thread 32, there is initially abutment between the movement screw 36 and the clamping bolt 28 in the region of the mutually facing inner and outer cones 44, 46. In the further course of the clamping operation, the clamping bolt 28 is pushed with its outer cone 40 into the inner cone 42 until there is abutment against the stop screw 34. In this state, the actual clamping operation commences, in which the clamping forces introduced by the holding elements 36, 34 are converted by way of the conical abutting surfaces into axial forces drawing the locating pin 12 into the locating bore 16, as a result of an axial offset. The axial forces lead to planar face clamping at the annular faces 22, 24 of the first and second component 10, 14. The axial forces are thereby transferred through the clamping bolt 28 on the side of the bore base 50 by way of the transverse bore 26 to the locating pin 12, and consequently to the component 10. On the other hand, in the region of the holding screws 34, 36, the clamping forces must be absorbed and reduced within the wall of the second component 14 by way of the respective internal thread 30, 32.

In the case of a coupling system that is widely used in practice and is known as the ABS system (ABS® is a registered trademark of the company KOMET GROUP GmbH), the holding elements 34, 36, like the clamping bolt 28, have on their inner cone and outer cone the same cone angle of about 90°. During the clamping operation, the radial forces introduced to the clamping system by way of the holding elements are converted into an axial component pressing the annular faces of the first and second components against one another. It has been found that part of the torque that is introduced by way of the holding element 36 that is formed as a movement screw is used for the purpose of overcoming the friction of the clamping bolt 28 in the transverse bore. This means that the annular faces 22, 24 are pressed against one another with a greater radial force on the side of the movement screw than on the side of the stop screw. In order to avoid this disadvantage, it has already been proposed (EP 1 343 602 B1) that the cone angle (apex angle) of the inner and outer cones that complement one another on the side of the movement screw 36 is greater than on the side of the stop screw 34. This measure compensates for the frictional losses occurring in the region of the transverse bore 26 during the clamping operation, so that the planar face pressing is made more uniform over the circumference. However, it is disadvantageous in this case that there is no compatibility between the ABS coupling system that is widely used in practice, with the same cone angles, and the technically improved coupling system with different cone angles, that would make it possible for components to be interchanged.

One particular aspect of the present invention lies in the realization that, in the region of abutment, the complementing, mutually facing outer and inner cones are not pressed against one another over their entire axial length, but only over part of the conical face. This results in the basic concept of the invention, that inner and outer cones of the clamping bolt 28 and/or of the holding elements 34, 36 can be subdivided in the axial direction into two substantially frustoconical contact portions arranged coaxially at a distance from one another, which during the clamping operation can be effective either individually or at one and the same time. This gives rise to various combinational possibilities, which lead to the compatibility of the two coupling systems with the same or different cone angles on the movement screw side and stop screw side.

In the case of the exemplary embodiment shown in FIGS. 1 to 4, both the inner cone 44 and the outer cone 40 of the clamping bolt 28 have in each case two substantially frustoconical contact portions 44', 44" and 40', 40" arranged coaxially at a distance from one another, which for their part expediently have different cone angles (cf. 4a to 4c). This measure allows compatibility to be established with a first group of holding elements 34, 36 according to FIGS. 2a, b, 3a, b, the outer and inner cones 46, 42 of which have in each case two substantially frustoconical contact portions 46', 46" and 42', 42" arranged at an axial distance from one another. The contact portions are in this case positioned in such a way that in each case only one contact portion of the holding elements 34, 36 complements one of the contact portions of the neighboring inner and outer cones of the clamping bolt 28, that is to say has the same cone angle and abuts against it in the clamping state. In addition, this requires that the dimensions of the outer and inner cones complementing one another are made to match one another.

Furthermore, this allows compatibility with a second group of holding elements, the outer and inner cones of which have, in keeping with the conventional ABS system, only a single frustoconical contact portion, which complements one of the contact portions of the neighboring inner and outer cones of the clamping bolt.

From the aspect of the holding elements 34, 36, a second variant of the invention consists in that the outer or inner cones 42, 46 of the holding elements have in each case two substantially frustoconical contact portions 42', 42" and 46', 46" arranged coaxially at an axial distance from one another, which expediently have different cone angles. Such an arrangement ensures compatibility with a first group of clamping bolts 28, the inner and outer cones 44, 40 of which have, in keeping with the above configurational variant according to FIGS. 4a to c, in each case one of two substantially frustoconical contact portions 40', 40" and 44', 44" complements one of the contact portions of the neighboring outer and inner cones 46, 42 of the holding elements 36, 34. On the other hand, here there is compatibility additionally with a second group of clamping bolts, the inner and outer cones of which have, in the manner of the conventional ABS system, in each case only one substantially frustoconical contact portion, which complements one of the contact portions of the neighboring outer or inner cones 46', 46" and 42', 42" of the holding elements 36, 34.

Figure 2A:
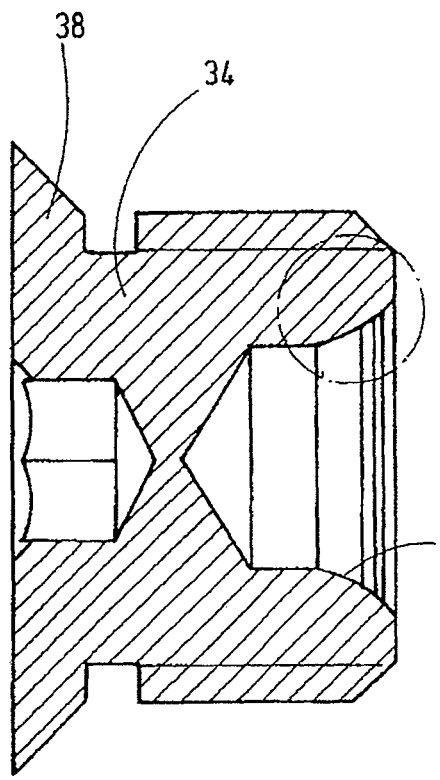
Figure 2B:
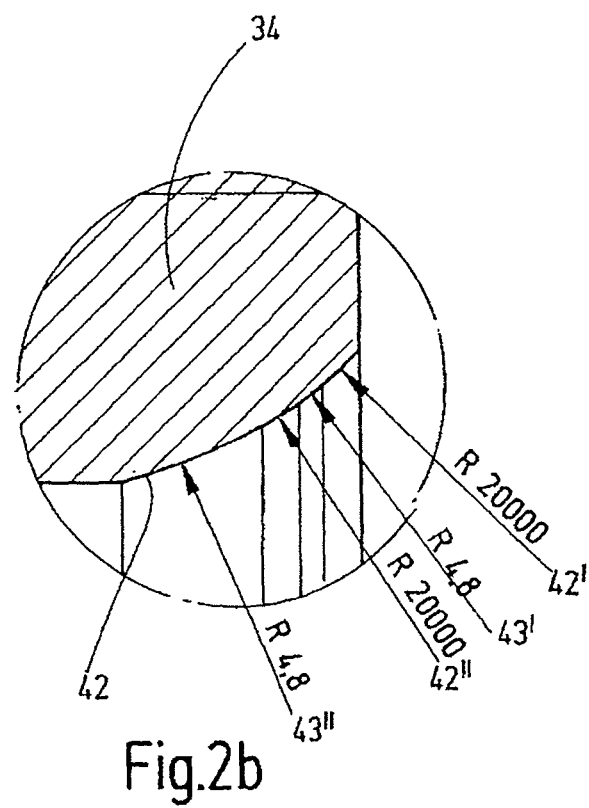
Figure 3A:
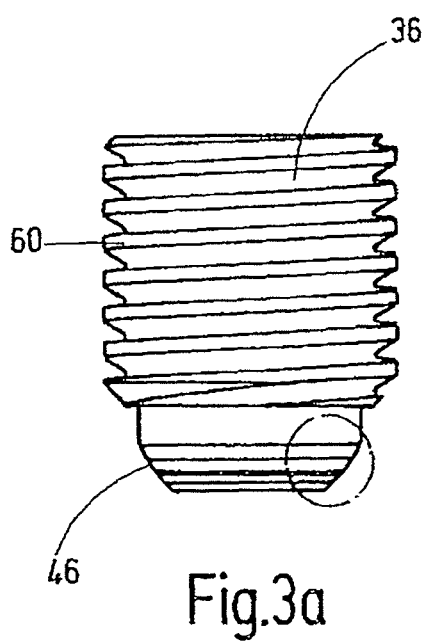

In the case of the configurational variants as shown in FIGS. 1 to 4, with which compatibility between the two coupling systems is important, the contact portions, arranged at an axial distance from one another, of the clamping bolt and of the holding elements have a cone angle that becomes greater toward the respectively free end face (cf. FIGS. 2a, 3a and 4a).

Figure 3B:
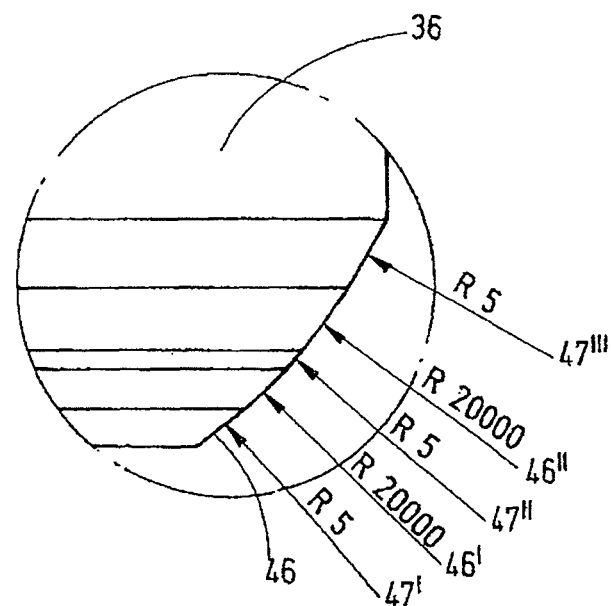

Both in the case of the holding elements 34, 36 and in the case of the clamping bolt 28, the contact portions are delimited at the peripheries thereof by in each case a substantially frustoconical peripheral portion. In the case of the holding element 34 formed as a stop screw, the peripheral portions 43', 43" are provided; in the case of the holding element 36 formed as a movement screw, the peripheral portions 47', 47", 47''' are provided (FIG. 3b). In the case of the clamping bolt 28, the peripheral portions 41', 41" are provided on the side of the outer cone 40, while the peripheral portions 45', 45", 45''' are provided on the side of the inner cone.

In the case of the exemplary embodiment as shown in FIGS. 1 to 4, both the contact portions and the peripheral portions are curved in a slightly crowned manner with the respectively specified radius of curvature 3.9 mm to 20 000 mm. The radii of curvature of the peripheral portions are in this case respectively less than the neighboring contact portions.

The exemplary embodiments according to FIGS. 5 to 8, 9 to 12 and 13 to 16 differ from the configurational variant as shown in FIGS. 1 to 4, in particular in the formation of the contact portions and the peripheral portions. For the sake of overall clarity and to avoid unnecessary repetition, in these figures the same parts are identified by the same designations as in the case of the group of FIGS. 1 to 4.

In the case of the exemplary embodiment as shown in FIGS. 5 to 8, it can be seen that the peripheral portions are not necessarily crowned but may also be concavely formed. For example in the case of the configurational variants as shown in FIG. 6b and FIG. 8c, this is shown by the peripheral portions 43', 45" in the region of the holding element 34 and the clamping bolt 28.

As can be seen from the configurational variants as shown in FIGS. 9 to 12 and 13 to 16, it is also possible in principle to clamp the contact portions, arranged at an axial distance from one another, of the outer and inner cones to one another in each case at one and the same time and in pairs. In this case, it is less a matter of the compatibility between the different clamping systems but a matter of producing a reliable clamping connection with two contact regions arranged at an axial distance from one another. This has the effect that, in the case of the exemplary embodiment as shown in FIGS. 9 to 12, the inner cone 42 of the holding element 34 that is formed as a stop screw and the inner cone of the clamping bolt 28 have a cone angle that becomes smaller toward the respectively free end face, while on the neighboring outer cone 40 of the clamping bolt 28 and 46 of the movement screw 36 it becomes greater toward the end face.

In the case of the exemplary embodiment shown in FIGS. 13 to 16, the outer cone 46 of the holding element 36 that is formed as a movement screw and the outer cone 40 of the clamping bolt 28 have in each case a cone angle that becomes smaller toward the free end face, while the complementary inner cones 44 of the clamping bolt 28 and 42 of the holding element 34 that is formed as a stop screw have a cone angle that becomes greater toward the free end face.

As already stated above, it is an advantage if the contact portions complementing one another of the outer and inner cones 40, 42 have a smaller cone angle on the side of the stop screw 34 than on the side of the movement screw 36. With the smaller cone angle on the side of the stop screw 34, an increased axial component of the clamping force is obtained and, consequently, compensation for the frictional losses of the clamping bolt 28 within the transverse bore 2.6.

On the other hand, it has been found that, with such a construction on the side of the movement screw 36, greater wear occurs both on the outer cone 46 of the movement screw 36 and on the inner cone 44 of the clamping bolt 28 than on the side of the stop screw 34. It has therefore proven to be particularly advantageous if, in keeping with the exemplary embodiment as shown in FIGS. 17a to c, the holding element 36 that is formed as a movement screw has an outer cone 46 and the clamping bolt 28 on the side of the movement screw has an inner cone 44 complementing said outer cone, with in each case only one frustoconical contact portion. In order to ensure the downward compatibility with respect to the ABS system, the cone angle in the single contact portion is approximately 90°.

On the other hand, in the case of the exemplary embodiment shown in FIG. 17a, the holding element 34 that is formed as a stop screw has an inner cone 42 and the clamping bolt 28 on the side of the stop screw has an outer cone 40, with in each case two frustoconical contact portions 42', 42"; 40', 40" arranged at an axial distance from one another with different cone angles 60° and 90°, of which in each case only one abuts against another in pairs. The cone angle here of the contact portions abutting against one another is 60°. The second contact portion is provided for a coupling with conventional ABS coupling parts and therefore has a cone angle of 90° (cf. FIGS. 17b and 17c).

FIG. 17b shows coupling elements with a conventional coupling bolt 28, the outer cone 40 of which on the side of the stop screw 34 has a cone angle of 90° and in the coupled state abuts against the 90° contact portion 42" of the stop screw.

FIG. 17c shows coupling elements with a conventional stop screw 34, the single inner cone 42 of which has a cone angle of 90° and, in the coupled state, abuts against the 90° contact portion 40" of the outer cone 40 of the clamping screw 28 that is on the stop screw side.

Consequently, the upward and downward compatibility of the coupling elements according to the invention can be appreciated particularly easily by referring to FIGS. 17a to c.

A further particular aspect of the invention can be seen in that, especially in the case of the holding element 36 that is formed as a movement screw, a thread 60 which has particularly good guiding properties in the counterthread and in the counterbore of the second component 14 is provided. On account of the improved guiding properties of the holding element 36 and of the clamping bolt 28 adjoining thereto, an improved repeat accuracy is achieved during the clamping operation.

Figures 3C, 3D:
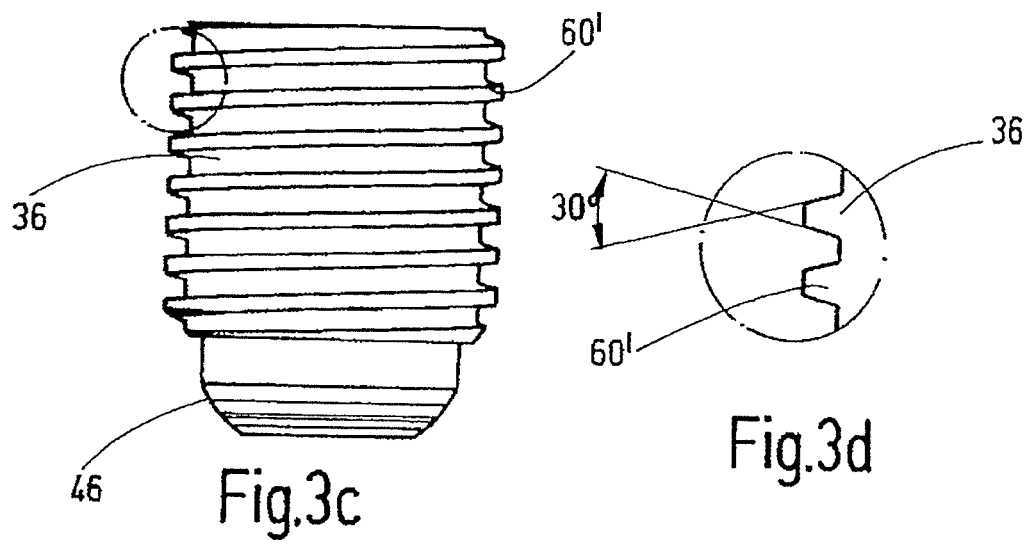
FIGS. 3c and d show a side view of a holding element formed as a movement screw or clamping screw, with a trapezoidal thread, and show a view of a detail of the threaded part of FIG. 3c.
Figures 3E, 3F:
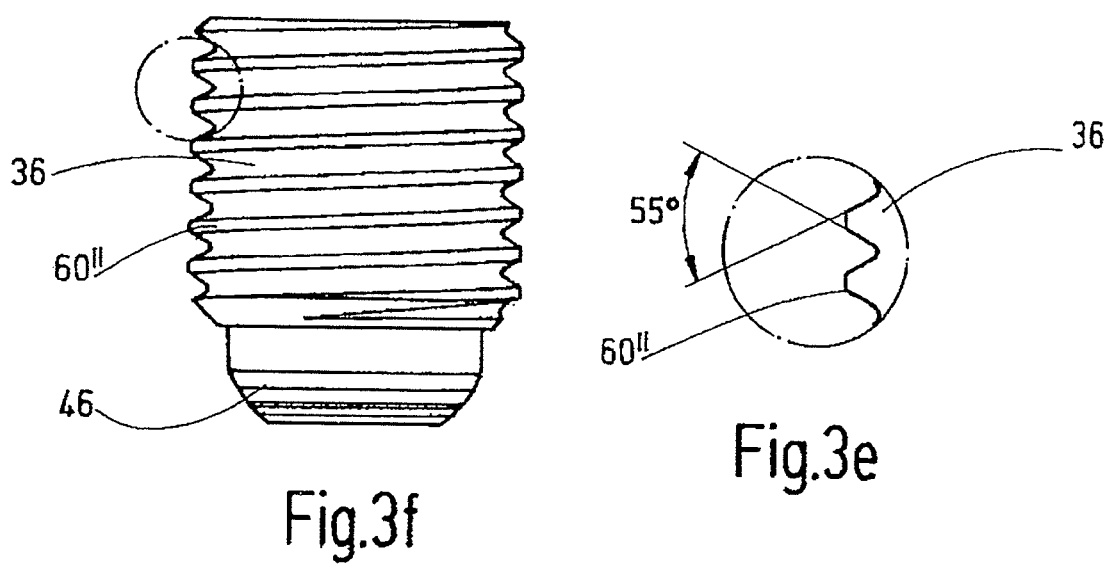
FIGS. 3f and e show a side view of a holding element formed as a movement screw or clamping screw, with a pipe thread, and show a view of a detail of the threaded part of FIG. 3f.

In the case of the exemplary embodiment as shown in FIGS. 3c and 3d, a trapezoidal thread 60' with a flank angle of 30° is provided on the holding element 36, while in the case of the exemplary embodiment as shown in FIGS. 3f and 3g a pipe thread 60", which has a flank angle of 55°, is provided. A particularly advantageous configurational variant is represented by the thread form as shown in FIGS. 7a and 7c as well as FIGS. 11a and 11c, which forms a sawtooth thread 60''', the supporting flank 61' of which has with respect to a radial plane 63 a flank angle of 15° and the flank 61" of which that is facing the center of the tool has a flank angle of 30°. It goes without saying that the flank angles are subject to an optimization, which may lead to further improvements by changes in one direction or the other.

Figure 5:
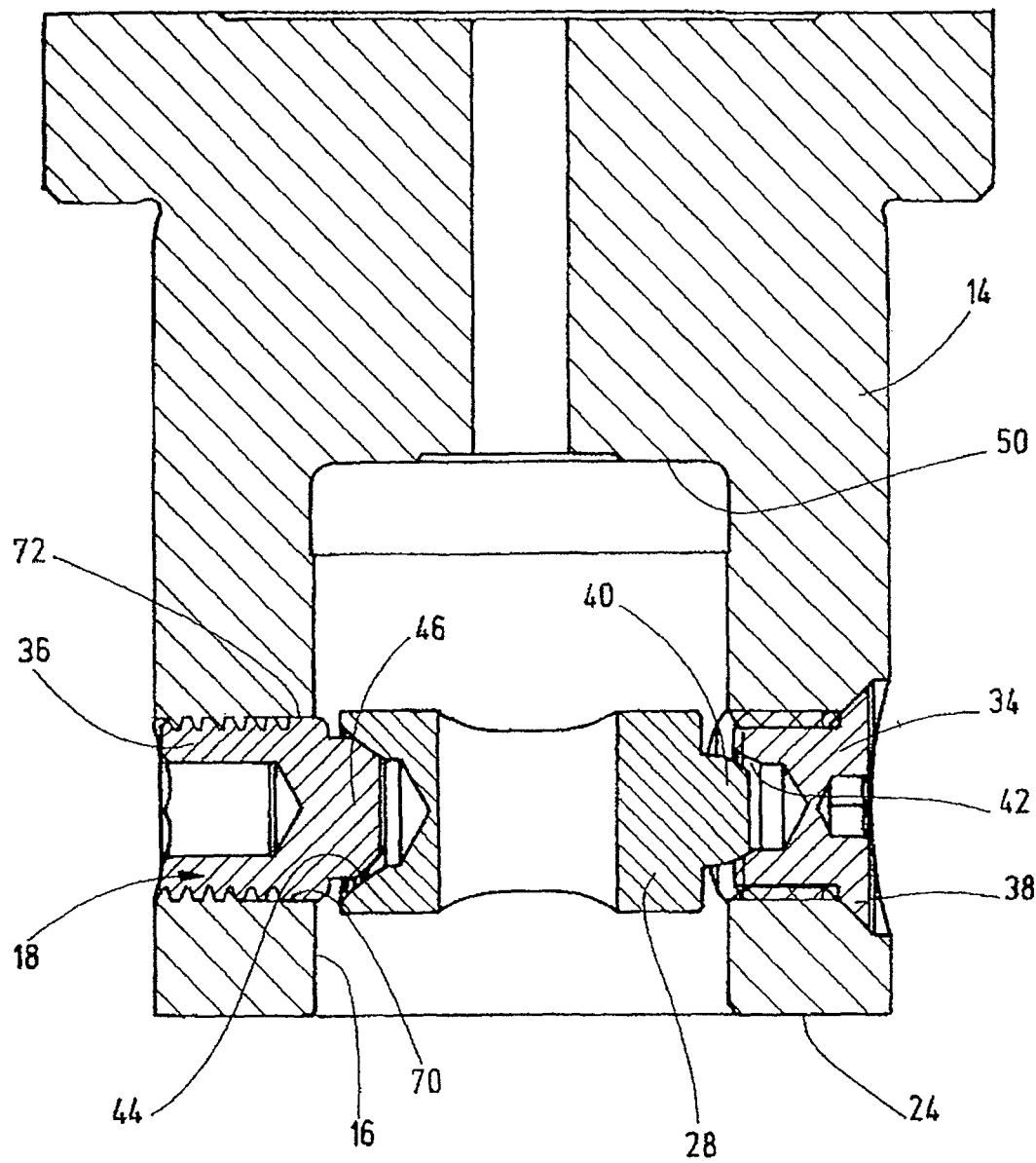
FIG. 5 shows a longitudinal section through an exemplary embodiment, modified in comparison with FIG. 1, of the component of a tool coupling that has the receptacle.
Figure 9:
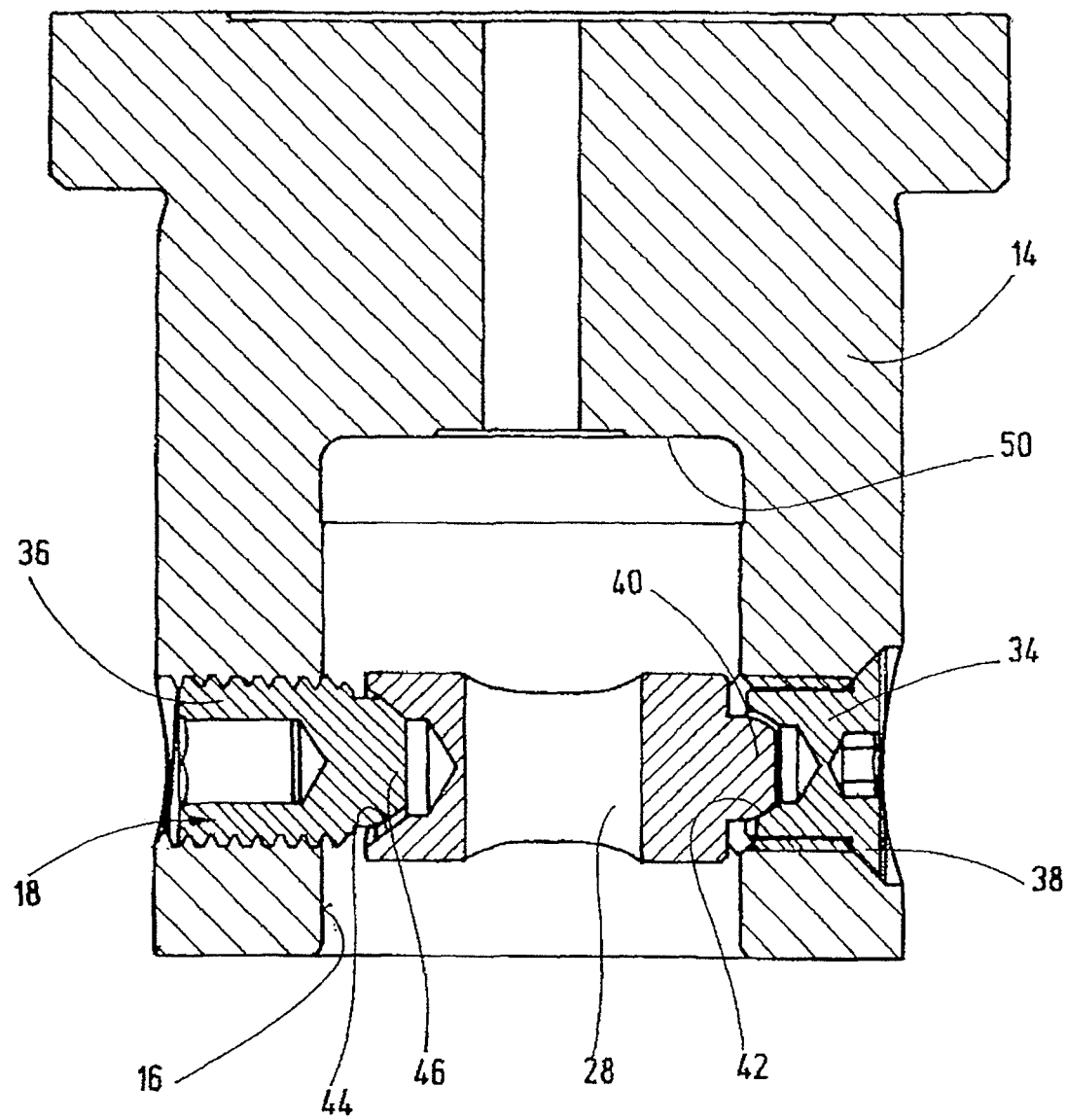
FIG. 9 shows a further exemplary embodiment, modified in comparison with FIG. 1, of the component of a tool coupling that contains the receptacle.
Figure 10:
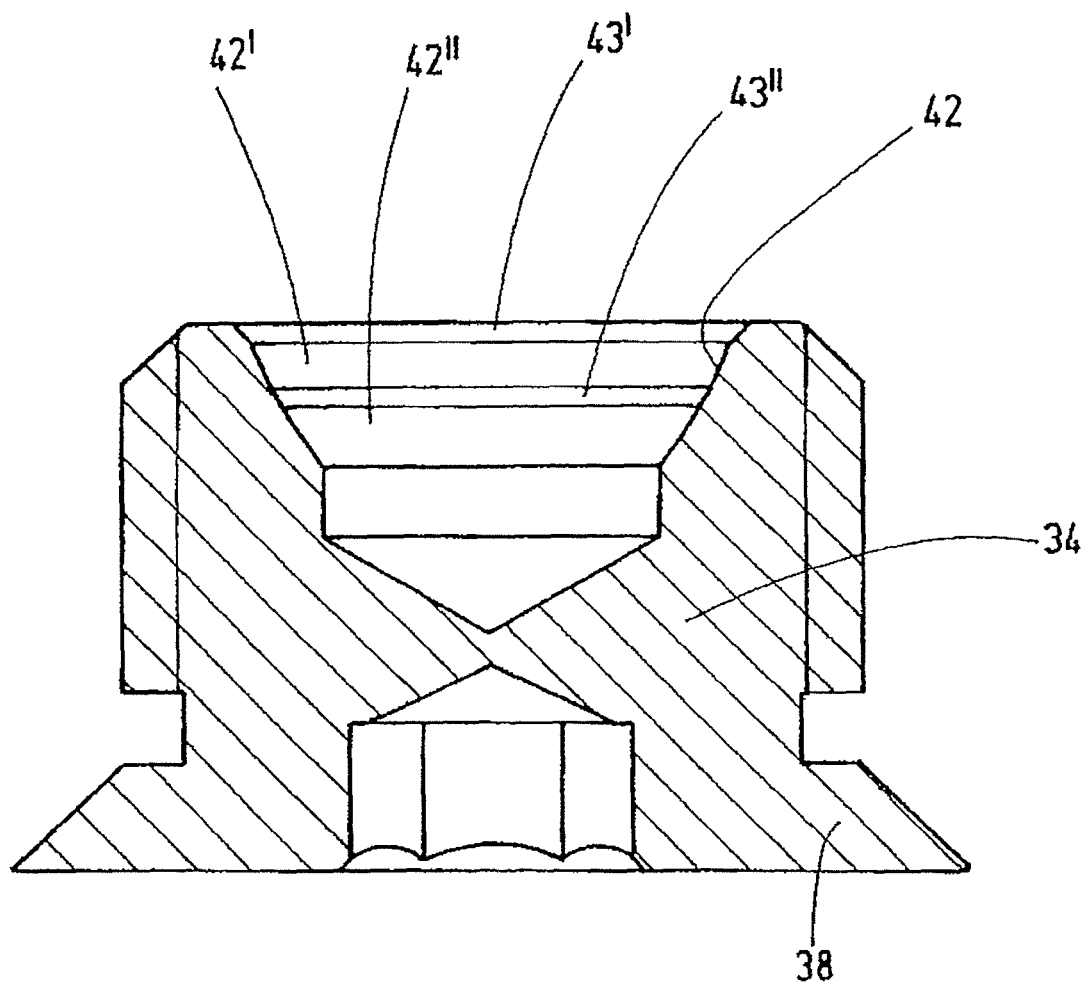
FIG. 10 shows a longitudinal section through a holding element of the tool coupling as shown in FIG. 9 that is formed as a stop screw or conical screw.
Figure 11B:
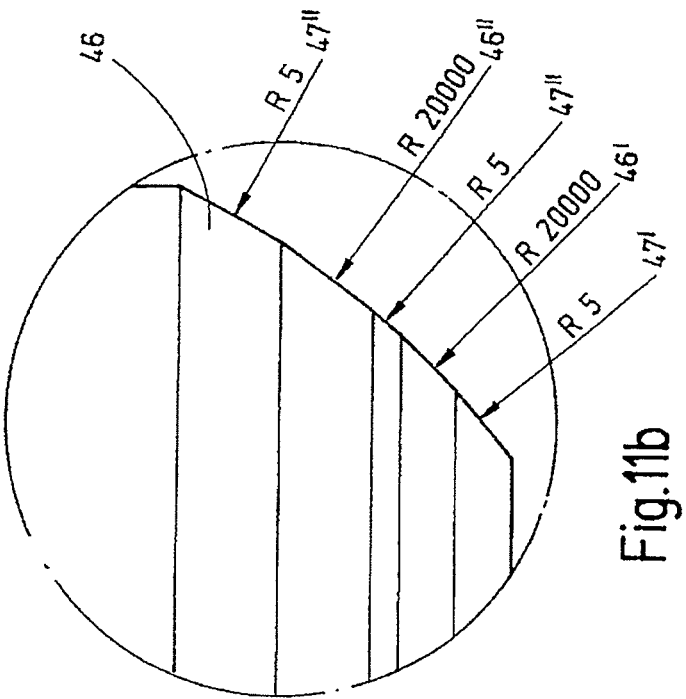
Figure 11C:
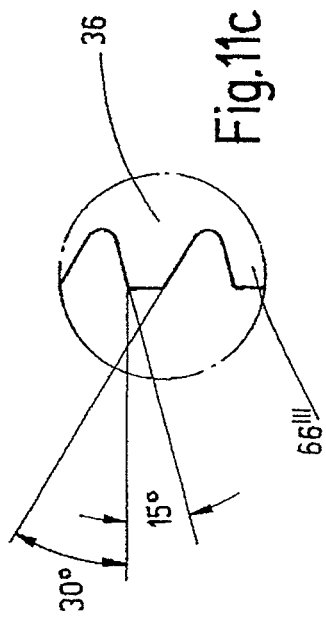
Figure 11A:
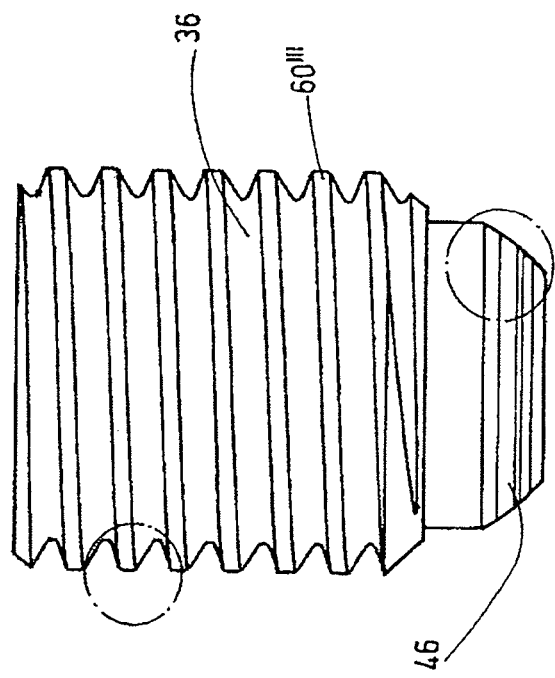
Figure 13:
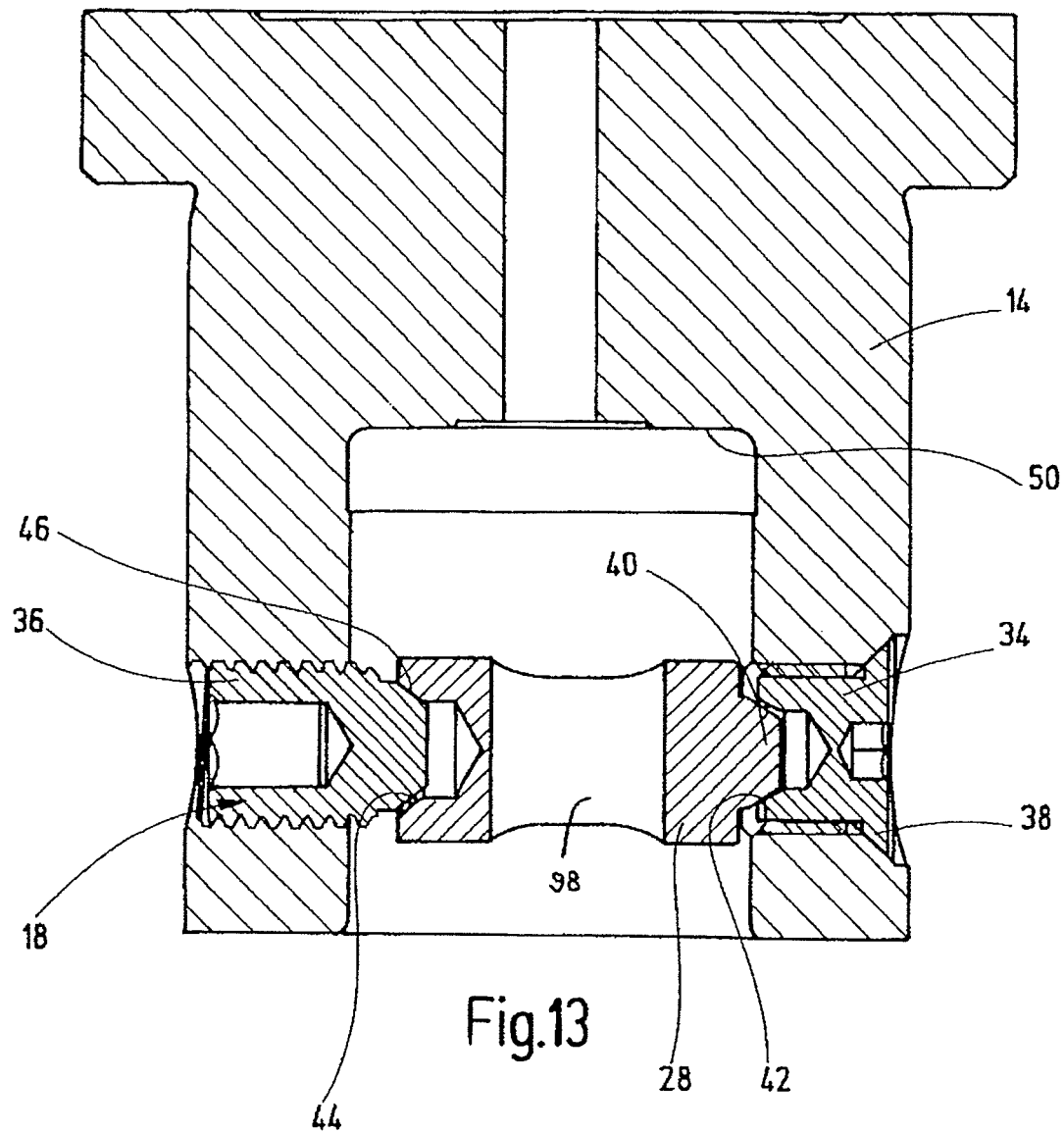
FIG. 13 shows a longitudinal section through the component of a further exemplary embodiment, modified in comparison with FIG. 1, of a tool coupling that contains the receptacle.

A further improvement in the guiding properties in the region of the holding element 36 that is formed as a movement screw can be achieved if the end of the radial bore 32 facing the locating bore is designed as a thread-free guiding bore and the movement screw has a corresponding thread-free guiding portion 72 (cf. FIGS. 5, 7a). The thread-free portions 70, 72 ensure that the movement screw 36 is guided with less locating play in the critical region of the cone connection and the thread is predominantly given a clamping function in the axial direction.

A further improvement in the repeat accuracy can be achieved if the clamping bolt and/or the holding elements have, at least in the region of the inner and/or outer cones, a friction-reducing coating or a friction-reducing surface finish.

In the case of the exemplary embodiment shown in FIG. 1, between the end face of the locating pin 12 and the base 50 of the locating bore 16 there is a sealing ring 78, which is provided with an axial aperture 76 and seals from the outside a coolant channel 80 led through the clamping mechanism 18. Furthermore, the clamping bolt 28 of the clamping mechanism 18 has a slot-like aperture 98, 98', which communicates with the coolant channel 80, 80' in the two components 10, 14 either directly or by way of a coolant pipe 81 passing through.

Figure 18A:
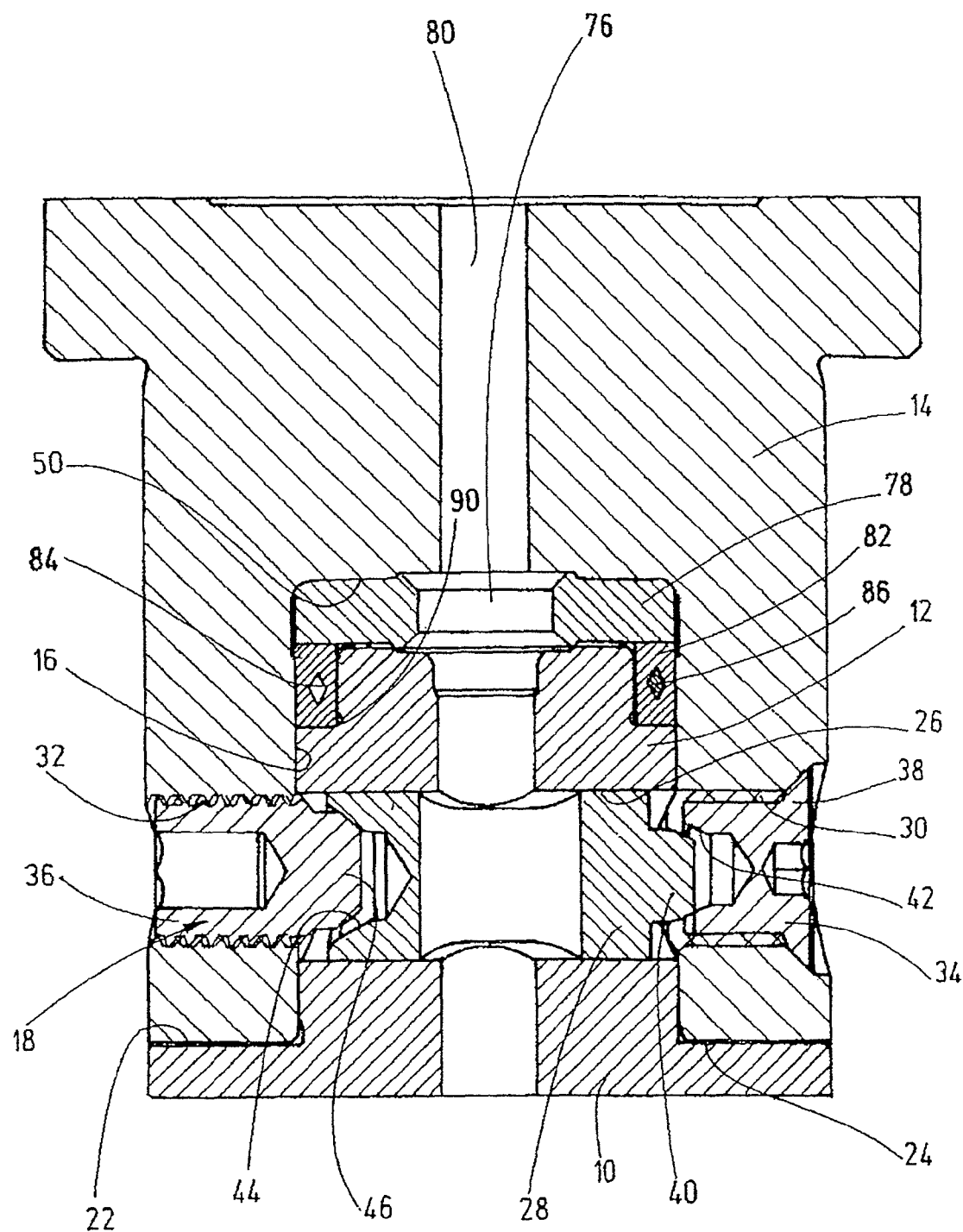
FIGS. 18a and b each show a longitudinal section through two further exemplary embodiments of a tool coupling with sealing rings and centering rings modified in comparison with FIG. 1.
Figure 18B:
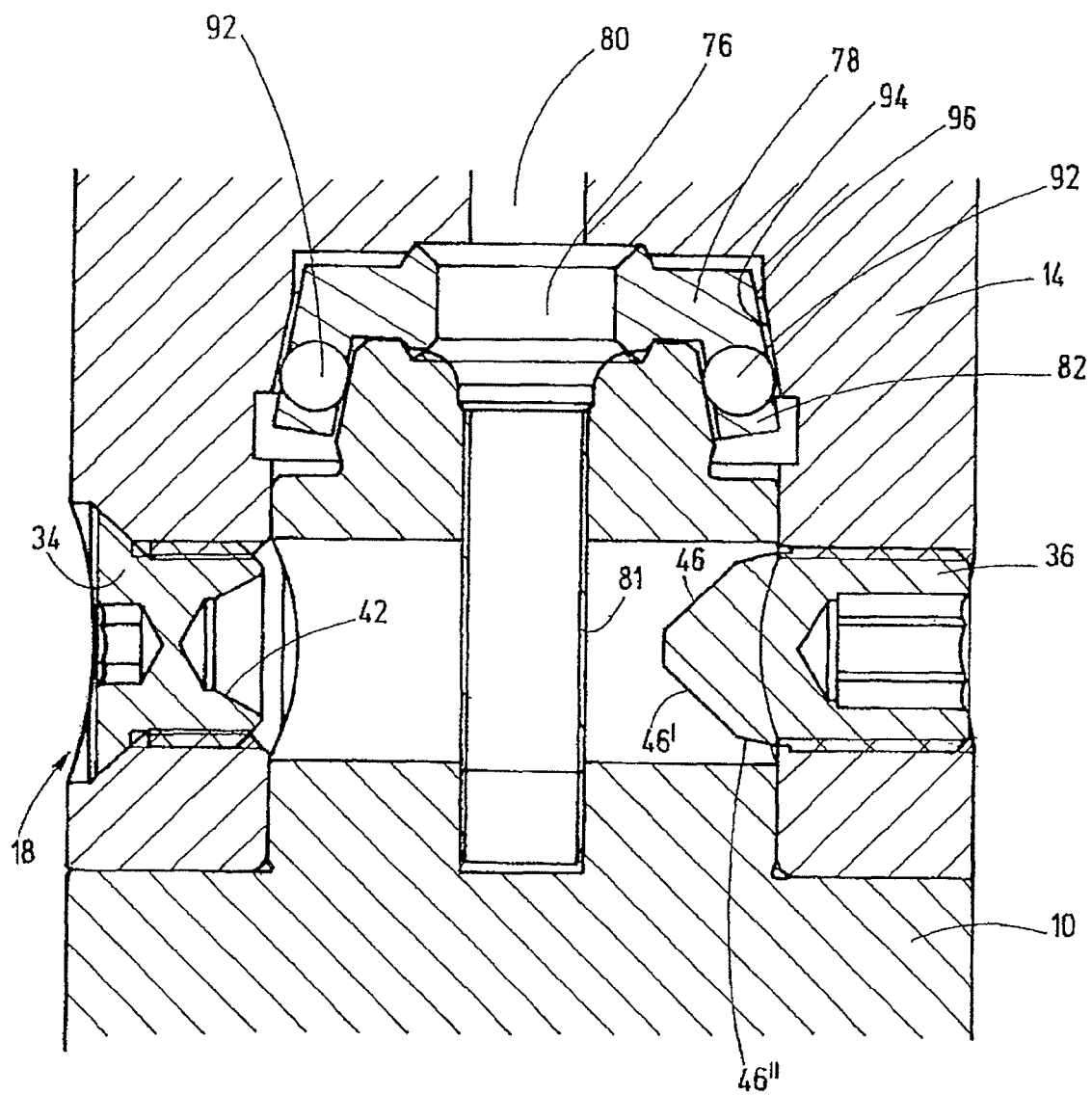
Figure 22:
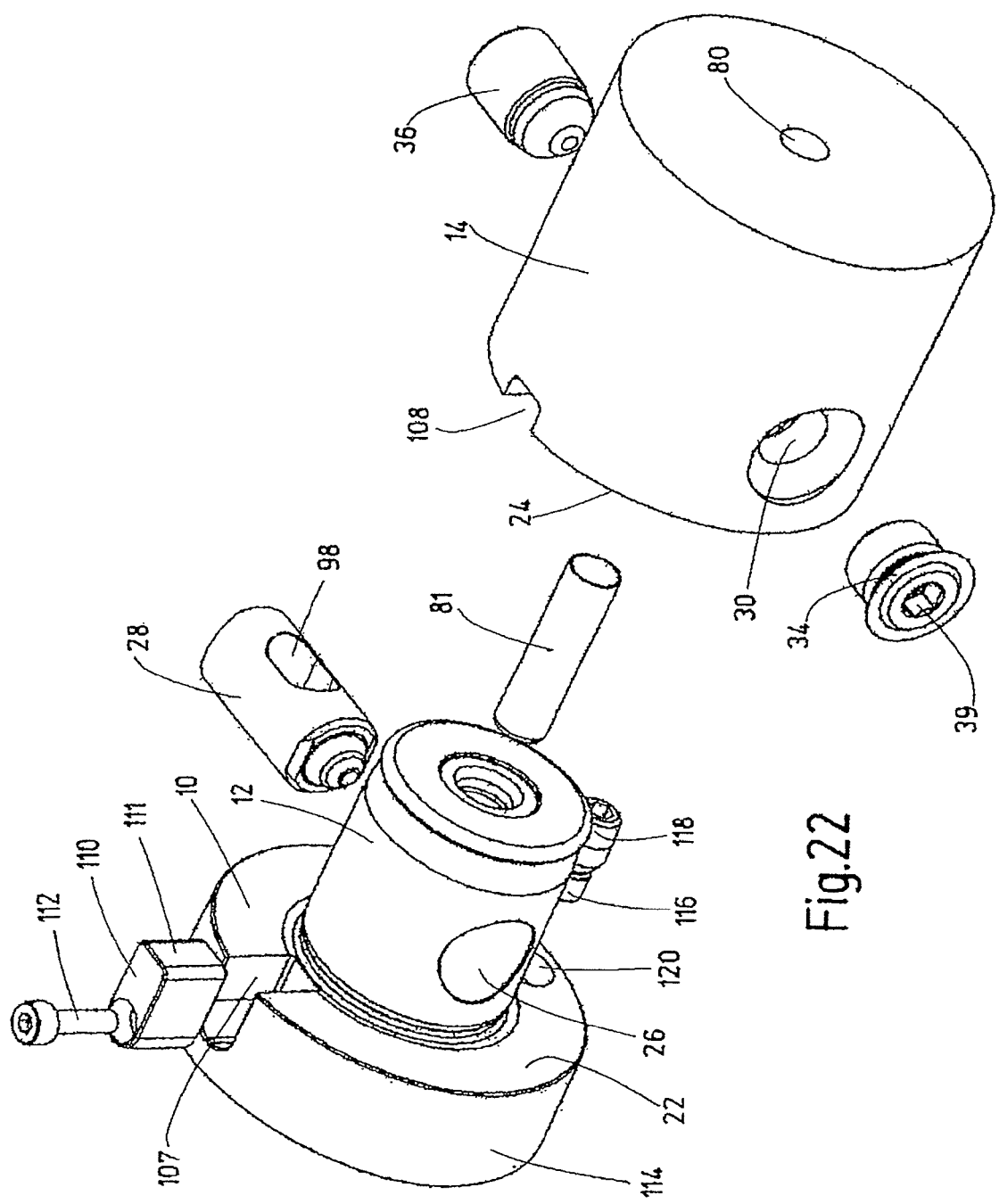
FIG. 22 shows a diagrammatic exploded representation of the tool coupling as shown in FIGS. 21a to c.

In the case of the exemplary embodiment shown in FIGS. 18b and 22, the coolant channel 80 coming from the second component 14 passes through the sealing ring 78 before entering a coolant pipe 81, which has been inserted through the slot-like aperture 98 in the clamping bolt 28 in a step-free manner and ends on the other side in the coolant channel 80' of the component 10. The coolant pipe 81 at the same time ensures rotational locking of the clamping bolt 28 in the transverse bore 26. This rotational locking is important to the extent that, at the transition to its outer cone and inner cone, the clamping bolt 28 is not exactly rotationally symmetrical to match the holding elements, and therefore needs a defined rotational orientation in the transverse bore (cf. FIGS. 20d, 22). The smooth transition makes the coolant pipe 81 particularly suitable for the minimum quantity lubrication technique (MQL).

Figure 20A:
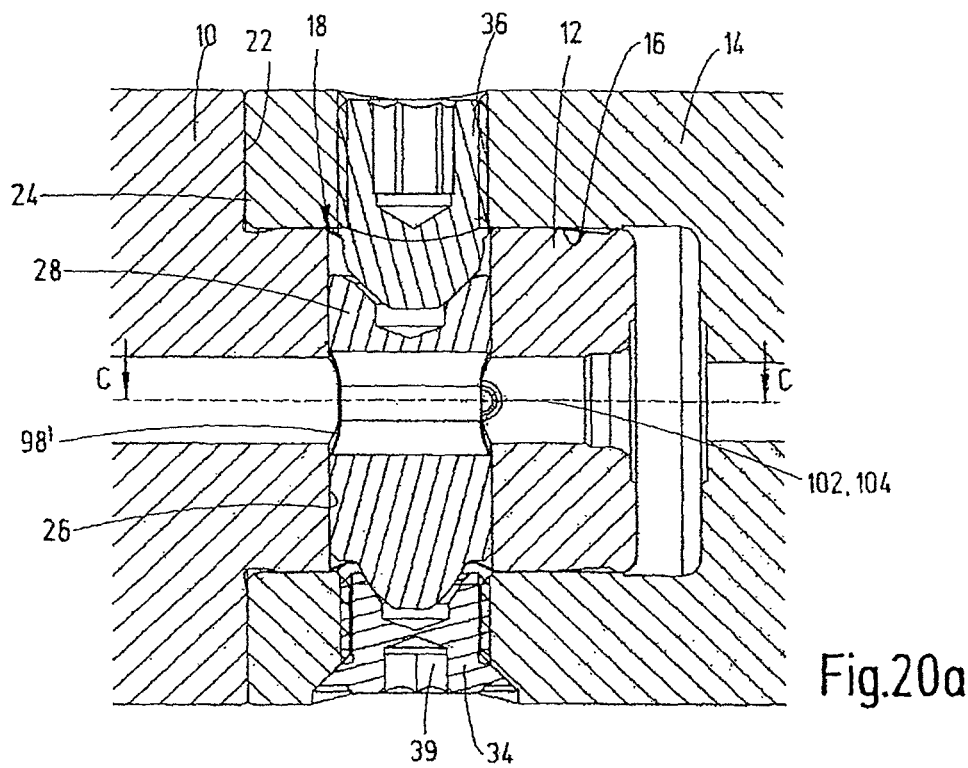
FIGS. 20a and b show a longitudinal section through an exemplary embodiment, modified in comparison with FIG. 1, of a tool coupling in planar face clamping with a 90° inner cone and with a 60° inner cone on the stop screw side and with direct coolant passage through the clamping mechanism.
Figure 20B:
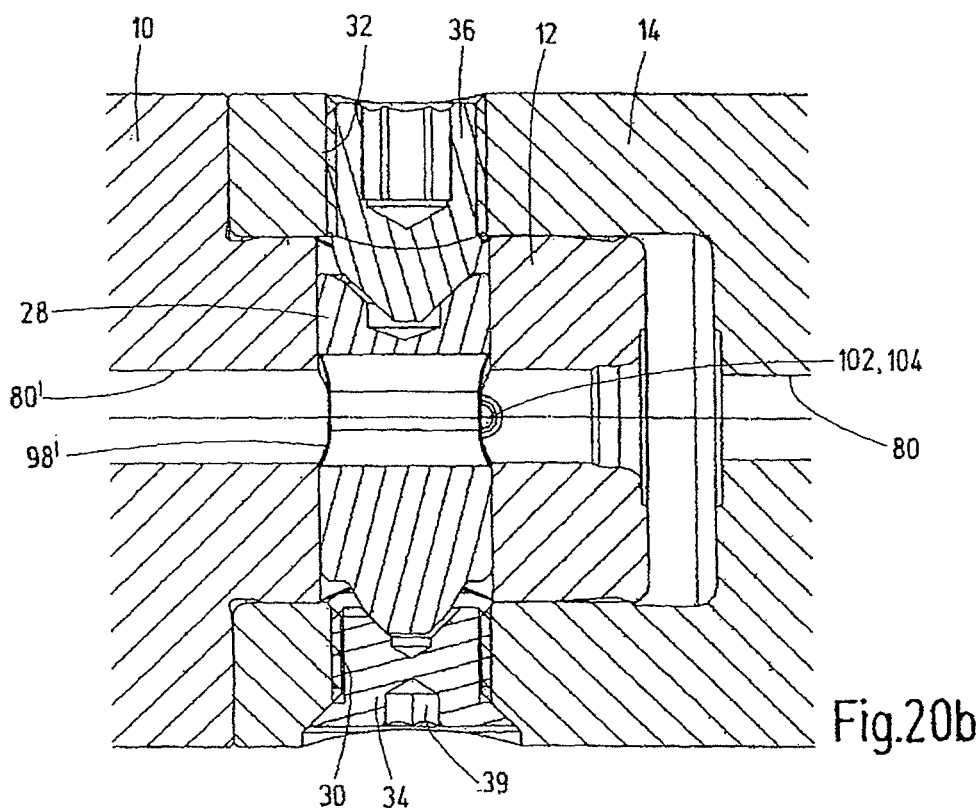
Figure 20C:
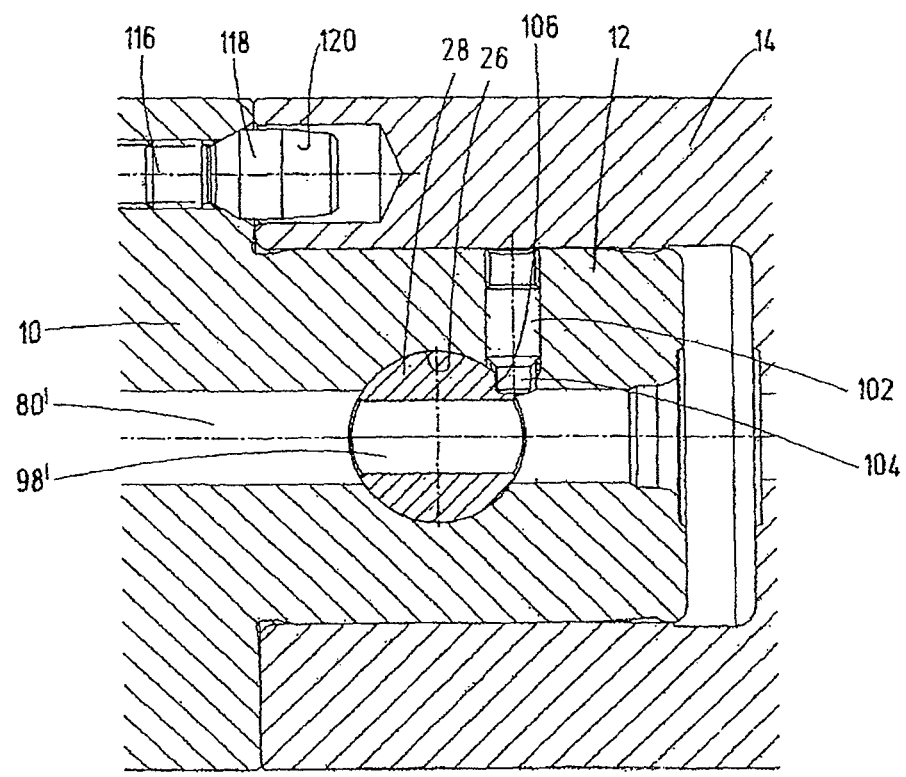
Figure 20D:
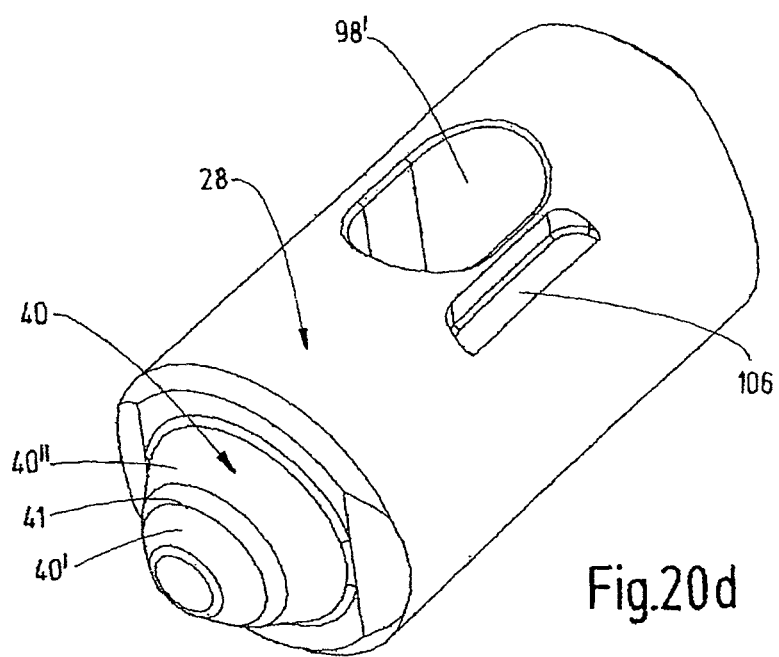
FIG. 20d shows a diagrammatic representation of the clamping bolt for the exemplary embodiment as shown in FIGS. 20a to c.

In the case of the exemplary embodiment shown in FIGS. 20a and b, the coolant pipe 81 is absent. Here, the cooling lubricant within the clamping mechanism 18 is made to pass directly through the aperture 98' arranged in the clamping bolt 28. In principle, a cylindrical aperture would be sufficient here. In view of the different cone angles 60° (FIGS. 20a) and 90° (FIG. 20b) of the connecting cones with respect to the holding element 34, the clamping bolt 28 penetrates into the transverse bore 26 to different degrees, depending on the effective cone angle. For complete overlapping, a slot-like aperture 98' is therefore required (cf. FIG. 20d). Furthermore, in this case additional rotational locking is provided for the clamping bolt 28. The rotational locking consists here of a locking pin 102, which is screwed radially into the locating pin 12 and, on the side of the transverse bore 26, engages with its tip 104 in a locking manner in a peripherally open longitudinal recess 106 of the clamping bolt 28 (cf. FIG. 20d).

The sealing ring 78 is adjoined radially and axially by a centering ring 82, which contributes significantly to the centering of the two components 10, 14. The centering ring 82 may in this case either be connected to the sealing ring 78 in one piece (FIG. 1) or be formed as a part that is separate from the sealing ring 78 (FIG. 18a). The centering ring 82 arranged on the end of the pin can be made to expand by axial pressure when it comes into contact with the bore base 50 on the receptacle side. In order to obtain specifically intended expansion, the centering ring 82 may either have at least one cavity 84, which extends completely or partially over the circumference of the centering ring, or be provided with an insert 86 of metal or plastic. The centering ring 82 is in this case in sealing contact with the sealing ring 78 by a turned groove that is not represented. The centering ring 82 may consist of metal, plastic or rubber or of a composite material. An elastomeric material is advantageously used for it.

When the components 10, 14 are separated, the sealing ring 78 remains in the locating bore 16, while the centering ring 82, if it is formed as a separate part, remains on the locating pin 12. Between the centering ring 82 and the locating pin 12 there is advantageously a form fit, which may be brought about, for example, by an annular bead 90 on the centering ring 82 and by a complementary peripheral groove in the locating pin 12.

In FIG. 18b there is shown a further exemplary embodiment of a sealing ring 78 with a formed-on centering ring 82, in which a number of contact balls 92 of metal or plastic are embedded in the centering ring 82, distributed over the circumference thereof. In order to reduce the surface pressing of the contact balls 92, part-cylindrical running and supporting tracks for the contact balls 92 may be formed into the centering surface 94 of the locating bore 16 and into the neighboring countersurface on the locating pin 12. When the components 10, 14 are separated, the sealing ring 78 remains with its centering ring 82 in the locating bore 16. The centering surfaces 94, 96 are conically formed for this purpose.

Figure 21A:
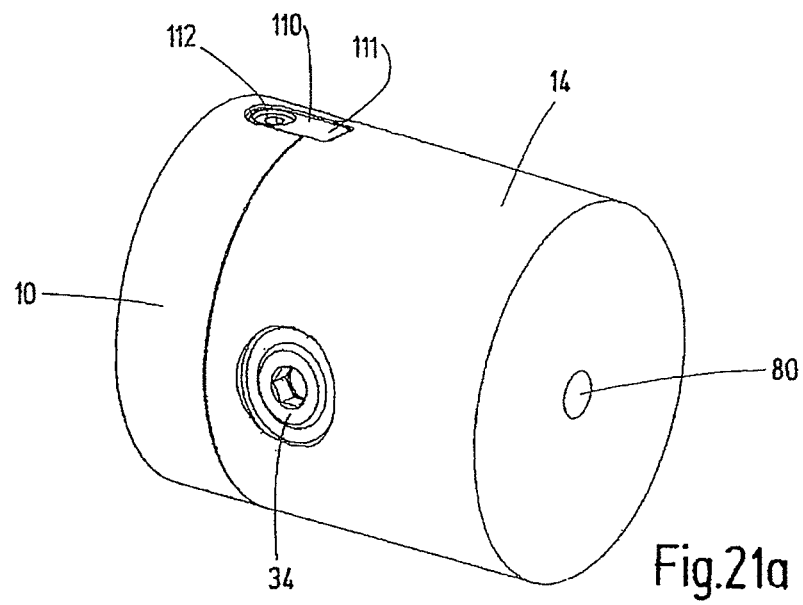
FIGS. 21a to c show a diagrammatic representation, a side view and a longitudinal section of an embodiment, modified in comparison with FIG. 1, of a tool coupling with a sliding block for the torque transfer.
Figure 21B:
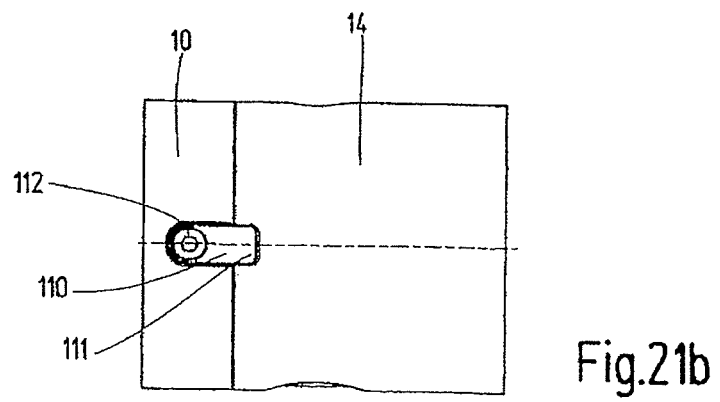
Figure 21C:
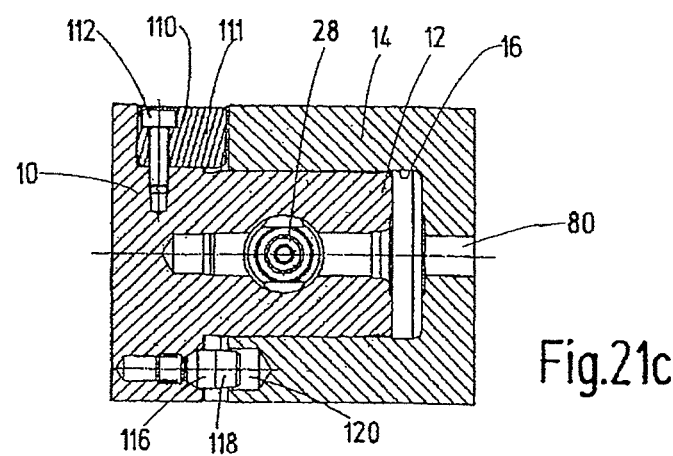

The measures according to the invention allow a reduction in the frictional losses to be obtained by specifically choosing the cone angles within the clamping mechanism 18 between the clamping bolt 28 and the holding elements, and consequently allow a clamping force that is increased by 30 to 40% and a correspondingly greater flexural rigidity in the region of the connecting device to be achieved. To allow better use to be made of this advantage, precautions that lead to higher torque take-up within the connection are also taken. In the case of the exemplary embodiment shown in FIGS. 21a to c, 22, for this purpose a radial groove 108 is provided in the component 14 in the region of the annular faces 22, 24 and a sliding block 110 is provided in the component 10, said groove and said block engaging exactly with one another in the assembled state. With a fastening screw 112, the sliding block 110 is fitted radially into a recess 107 in the flange 114 of the component 10 and projects with its driver part 111 axially beyond the annular face 22 in such a way that, in the coupled state, it can engage in the radial groove 108 of the other component 14. Additionally provided in the annular face 22 of the first component 10 is an axially projecting orientation pin 116, which in the assembled state engages with its step 118 into an orientation bore 120 in the region of the planar face 24 of the second component 14. The orientation pin 116 is only of secondary importance in comparison with the sliding block 110 for the torque transfer (cf. FIG. 21c).

To sum up, the following can be stated: the invention relates to a device for connecting two components 10, 14, for example two tool parts. The first component 10 has in this case a cylindrical locating pin 12 and an annular face 22 projecting radially beyond this locating pin 12, while the second component 14 has a cylindrical locating bore 16 for receiving the locating pin 12 and an annular face 24 surrounding the locating bore 16. Also provided is a clamping mechanism 18, which ensures during the clamping operation that the locating pin 12 is drawn into the locating bore 16 and at the same time the annular faces 22, 24 are pressed against one another. The clamping mechanism includes a clamping bolt 28, which is arranged movably in a transverse bore 26 of the locating pin 12, and two holding elements 34, 36, which lie diametrically opposite one another in the second component 14, abut with a respective inner or outer cone at the end face against a complementary outer or inner cone of the clamping bolt 28 and, during the clamping operation, are clamped with said clamping bolt in a wedge-like manner. According to the invention, the inner and/or outer cones of the clamping bolt 28 and/or the holding elements 34, 36 have in each case two substantially frustoconical contact portions 40', 40", 44', 44", 42', 42", 46', 46" arranged coaxially at an axial distance from one another, which during the clamping operation can be effective either individually or at one and the same time.

LIST OF DESIGNATIONS 10 first component
12 locating pin
14 second component
16 locating bore
18 clamping mechanism
22 annular face (1st component)
24 annular face (2nd component)
26 transverse bore
28 clamping bolt
30 radial bore with internal thread
32 radial bore with internal thread
34 holding element (stop screw)
36 holding element (movement screw)
37 stop cone
38 countersunk head
39 polygonal socket
40 outer cone
40',40" contact portion
41',41" peripheral portion
42 inner cone
42',42" contact portion
43',43" peripheral portion
44 inner cone
44',44" contact portion
45', 45", 45'" peripheral portion
46 outer cone 46',46" frustoconical contact portion
47',47", 47''' peripheral portion
50 bore base
52 lateral circumference
54 clearance
56 elevation
57 highest point
58 outer periphery
60 thread
60' trapezoidal thread
60" pipe thread
60''' sawtooth thread
70 thread-free portion/thread-free guiding bore
72 thread-free portion/thread-free guiding portion
76 aperture
78 sealing ring
80,80' coolant channel
81 coolant pipe
82 centering ring
84 cavity
86 insert
90 annular bead
92 contact balls
94,96 centering surfaces
98,98' slot-like aperture
102 locking pin
104 tip
106 longitudinal recess
108 radial groove
110 sliding block
111 driver part
112 fastening screw
114 flange
116 orientation pin
118 tip
120 orientation bore
R radius of curvature (mm)

The invention claimed is:

1. A device for connecting two components having a cylindrical locating pin arranged on a first component and a radially projecting annular face surrounding the locating pin at the root thereof, a cylindrical locating bore arranged in a second component for receiving the locating pin and having an annular face surrounding the locating bore at the periphery thereof, a clamping bolt, which is movably guided with a cylindrical guiding surface in a transverse bore of the locating pin, has at its extreme ends an inner cone or outer cone concentric to the guiding surface and is of a length that is less than the diameter of the locating pin in the region of the transverse bore, and two holding elements which are inserted in radial bores that lie diametrically opposite one another in the region of the locating bore and are provided with an internal thread, an outer cone or inner cone facing the interior of the locating bore and complementing the inner or outer cone of the clamping bolt and, during the clamping operation, can be clamped in a wedge-like manner with the clamping bolt by substantially frustoconical contact portions assigned to one another, the inner and outer cones that complement one another having in pairs an axial offset that has the effect during the clamping operation of drawing the locating pin into the locating bore and pressing the annular faces against one another, characterized in that the inner cone and/or the outer cone of the clamping bolt has two substantially frustoconical contact portions arranged coaxially at an axial distance from one another, having different cone angles and which, during the clamping operation with the holding elements, are effective either individually or at one and the same time.

2. The device as claimed in claim 1, characterized in that the outer cone or the inner cone of the holding elements has two substantially frustoconical contact portions arranged coaxially at an axial distance from one another with different cone angles, only one of which complements one of the contact portions of the neighboring inner cone or outer cone of the clamping bolt.

3. The device as claimed in claim 1, characterized in that the outer cone or the inner cone of the holding elements has only one substantially frustoconical contact portion which complements one of the contact portions of the neighboring inner cone or outer cone of the clamping bolt.

4. The device as claimed in claim 1, characterized in that the outer cone or the inner cone of the holding elements has two substantially frustoconical contact portions arranged coaxially at an axial distance from one another, both of which complement, in each case, one of the contact portions of the neighboring inner cone or outer cone of the clamping bolt.

5. The device as claimed in claim 1, characterized in that the contact portions, arranged at an axial distance from one another, of the clamping bolt and of the holding elements have a cone angle that becomes greater toward a respectively free end face.

6. The device as claimed in claim 1, characterized in that the substantially frustoconical contact portions of the clamping bolt and/or of the holding elements have a slightly curved lateral surface in the axial direction.

7. The device as claimed in claim 1, characterized in that the contact portions of the clamping bolt and of the holding elements are delimited at the surrounding peripheries thereof by, in each case, a substantially frustoconical peripheral portion.

8. The device as claimed in claim 7, characterized in that the peripheral portions have a lateral surface that is crowned or curved in a flute-like manner in the axial direction.

9. The device as claimed in claim 1, characterized in that one of the holding elements is formed as a stop screw that is fixed on the second component and the other holding element is formed as a movement screw that can be actuated during the clamping operation, and the substantially frustoconical contact portions complementing one another have a smaller cone angle on the side of the stop screw than on the side of the movement screw.

10. The device as claimed in claim 9, characterized in that the holding element that is formed as a movement screw has an outer cone and the clamping bolt on the side of the movement screw has an inner cone complementing said outer cone with, in each case, only one substantially frustoconical contact portion.

11. The device as claimed in claim 9, characterized in that the holding element that is formed as a stop screw has an inner cone and the clamping bolt on the side of the stop screw has an outer cone with, in each case, two substantially frustoconical contact portions arranged at an axial distance from one another with different cone angles.

12. The device as claimed in claim 9, characterized in that the holding element is formed as a stop screw and a flange-like countersunk head which is delimited by a circular outer periphery and a stop cone, and an elevation, which is arranged at an axial distance within the outer periphery, delimits a central polygonal socket and the highest point of which in the assembled state is arranged within the cylindrical lateral circumference of the second component.

13. The device as claimed in claim 12, characterized in that the elevation has a substantially frustoconical shape and is arranged concentrically in relation to the outer periphery.

14. The device as claimed in claim 1, characterized in that the movement screw and/or the stop screw has a sawtooth thread with a flat supporting flank and cylindrical guiding surface portions.

15. The device as claimed in claim 14, characterized in that the supporting flank has, with respect to a radial plane, a flank angle of 5° to 15°, while the opposing flank, facing the center of the tool, has a flank angle of 25° to 35°.

16. The device as claimed in claim 1, characterized in that the movement screw and/or the stop screw has a trapezoidal thread with cylindrical guiding surface portions.

17. The device as claimed in claim 1, characterized in that the clamping bolt and/or the holding elements have, at least in the region of the inner and/or outer cones, a friction-reducing coating or surface finish.

18. The device as claimed in claim 1, characterized in that the clamping bolt of the clamping mechanism has a slot-like aperture which communicates with axially central coolant channels in the two components either directly or indirectly by way of a coolant pipe passing through.

19. The device as claimed in claim 1, characterized in that a radial groove is provided in the second component in the region of the annular faces and a sliding block complementing the radial groove is provided in the first component, said groove and said block engaging exactly with one another in the assembled state, thereby producing a torque transfer.

20. The device as claimed in claim 1, characterized in that a sealing ring provided with an axial aperture and a centering ring supported on the inner wall of the locating bore, are arranged between the end face of the locating pin and the bottom of the locating bore.

21. The device as claimed in claim 20, characterized in that the sealing ring and the centering ring are connected to one another in one piece.

22. A device for connecting two components, having a cylindrical locating pin arranged on a first component and a radially projecting annular face surrounding the locating pin at the root thereof, a cylindrical locating bore arranged in a second component for receiving the locating pin and having an annular face surrounding the locating bore at the periphery thereof, a clamping bolt, which is movably guided with a cylindrical guiding surface in a transverse bore of the locating pin, has at its extreme ends an inner cone or outer cone concentric to the guiding surface and is of a length that is less than the diameter of the locating pin in the region of the transverse bore, and having two holding elements which are inserted in radial bores that lie diametrically opposite one another in the region of the locating bore and are provided with an internal thread, an outer cone or inner cone facing the interior of the locating bore and complementing the inner or outer cone of the clamping bolt and, during the clamping operation, can be clamped in a wedge-like manner with the clamping bolt by substantially frustoconical contact portions assigned to one another, the inner and outer cones that complement one another having in pairs an axial offset that has the effect during the clamping operation of drawing the locating pin into the locating bore and pressing the annular faces against one another, characterized in that the outer cone or the inner cone of at least one of the holding elements has two substantially frustoconical contact portions arranged coaxially at an axial distance from one another, having different cone angles, which during the clamping operation with the clamping bolt are effective either individually or at one and the same time.

23. The device as claimed in claim 22, characterized in that the inner cone and/or outer cone of the clamping bolt has two substantially frustoconical contact portions arranged coaxially at an axial distance from one another, with different cone angles, only one of which in each case complements one of the contact portions of the neighboring outer cone or inner cone of the holding elements.

24. The device as claimed in claim 22, characterized in that the inner cone and/or the outer cone of the clamping bolt has only one substantially frustoconical contact portion, which complements one of the contact portions of the neighboring outer cone or inner cone of one of the holding elements.

25. The device as claimed in claim 22, characterized in that the inner cone and/or the outer cone of the clamping bolt has two substantially frustoconical contact portions arranged coaxially at an axial distance from one another, both of which complement one of the contact portions of the neighboring outer cone or inner cone of one of the holding elements.

26. A device for connecting two components having a cylindrical locating pin arranged on a first component and having a radially projecting annular face surrounding the locating pin at the root thereof, a cylindrical locating bore arranged in a second component for receiving the locating pin and having an annular face surrounding the locating bore at the periphery thereof, a clamping bolt, which is movably guided with a cylindrical guiding surface in a transverse bore of the locating pin, has at its extreme ends an inner cone or outer cone concentric to the guiding surface and is of a length that is less than the diameter of the locating pin in the region of the transverse bore, and two holding elements which are inserted in radial bores that lie diametrically opposite one another in the region of the locating bore and are preferably provided with an internal thread, an outer cone or inner cone facing the interior of the locating bore and complementing the inner or outer cone of the clamping bolt and, during the clamping operation, can be clamped in a wedge-like manner with the clamping bolt by substantially frustoconical contact portions assigned to one another, the inner and outer cones that complement one another having in pairs an axial offset that has the effect during the clamping operation of drawing the locating pin into the locating bore and pressing the annular faces against one another, characterized in that the inner cone and/or the outer cone of the clamping bolt has two substantially frustoconical contact portions arranged coaxially at an axial distance from one another, having different cone angles and which during the clamping operation with the holding elements are effective either individually or at one and the same time,
  wherein the outer cone or the inner cone of the holding elements has two substantially frustoconical contact portions arranged coaxially at an axial distance from one another with different cone angles, only one of which complements one of the contact portions of the neighboring inner cone or outer cone of the clamping bolt, or
  the outer cone or the inner cone of the holding elements has only one substantially frustoconical contact portion which complements one of the contact portions of the neighboring inner cone or outer cone of the clamping bolt, or
  the outer cone or the inner cone of the holding elements has two substantially frustoconical contact portions arranged coaxially at an axial distance from one another, both of which complement one of the contact portions of the neighboring inner cone or outer cone of the clamping bolt.

27. The device as claimed in claim 26, characterized in that the contact portions, arranged at an axial distance from one another, of the clamping bolt and of the holding elements have a cone angle that becomes greater toward the respectively free end face.

28. The device as claimed in claim 26, characterized in that the substantially frustoconical contact portions of the clamping bolt and/or of the holding elements have a slightly curved lateral surface in the axial direction.

29. The device as claimed in claim 26, characterized in that the contact portions of the clamping bolt and of the holding elements are delimited at the surrounding peripheries thereof by, in each case, a substantially frustoconical peripheral portion.

30. The device as claimed in claim 29, characterized in that the peripheral portions have a lateral surface that is crowned or curved in a flute-like manner in the axial direction.

31. The device as claimed in claim 26, characterized in that one of the holding elements is formed as a stop screw that is fixed on the second component and the other holding element is formed as a movement screw that can be actuated during the clamping operation, and in that the substantially frustoconical contact portions complementing one another have a smaller cone angle on the side of the stop screw than on the side of the movement screw.

32. The device as claimed in claim 31, characterized in that the holding element that is formed as a movement screw has an outer cone and the clamping bolt on the side of the movement screw has an inner cone complementing said outer cone with only one substantially frustoconical contact portion.

33. The device as claimed in claim 31, characterized in that the holding element that is formed as a stop screw has an inner cone and the clamping bolt on the side of the stop screw has an outer cone with, in each case, two substantially frustoconical contact portions arranged at an axial distance from one another, with different cone angles.

34. The device as claimed in claim 31, characterized in that the holding element that is formed as a stop screw has a flange-like countersunk head which is delimited by a circular outer periphery and has a stop cone and an elevation, which is arranged at an axial distance within the outer periphery, delimits a central polygonal socket and the highest point of which in the assembled state is arranged within the cylindrical lateral circumference of the second component.

35. The device as claimed in claim 34, characterized in that the elevation has a substantially frustoconical shape and is arranged concentrically in relation to the outer periphery.

36. The device as claimed in claim 26, characterized in that the movement screw and/or the stop screw has a sawtooth thread with a flat supporting flank and cylindrical guiding surface portions.

37. The device as claimed in claim 26, characterized in that the movement screw and/or the stop screw has a trapezoidal thread with cylindrical guiding surface portions.

38. The device as claimed in claim 26, characterized in that the clamping bolt and/or the holding elements have, at least in the region of the inner and/or outer cones, a friction-reducing coating or surface finish.

39. The device as claimed in claim 26, characterized in that the clamping bolt of the clamping mechanism has a slot-like aperture which communicates with axially central coolant channels in the two components either directly or indirectly by way of a coolant pipe passing through.

40. The device as claimed in claim 26, characterized in that a radial groove is provided in the second component in the region of the annular faces and a sliding block complementing the radial groove is provided in the first component (10), said groove and said block engaging exactly with one another in the assembled state, thereby producing a torque transfer.

41. The device as claimed in claim 26, characterized in that a sealing ring, provided with an axial aperture, and a centering ring, supported on the inner wall of the locating bore, are arranged between the end face of the locating pin and the bottom of the locating bore.

42. The device as claimed in claim 41, characterized in that the sealing ring and the centering ring are connected to one another in one piece.

43. A device for connecting two components having a cylindrical locating pin arranged on a first component and a radially projecting annular face surrounding the locating pin at the root thereof, a cylindrical locating bore arranged in a second component for receiving the locating pin and having an annular face surrounding the locating bore at the periphery thereof, a clamping bolt, which is movably guided with a cylindrical guiding surface in a transverse bore of the locating pin, has at its extreme ends an inner cone or outer cone concentric to the guiding surface and is of a length that is less than the diameter of the locating pin in the region of the transverse bore, and two holding elements which are inserted in radial bores that lie diametrically opposite one another in the region of the locating bore and are preferably provided with an internal thread, an outer cone or inner cone facing the interior of the locating bore and complementing the inner or outer cone of the clamping bolt and, during the clamping operation, can be clamped in a wedge-like manner with the clamping bolt by means of substantially frustoconical contact portions assigned to one another, the inner and outer cones that complement one another having in pairs an axial offset that has the effect during the clamping operation of drawing the locating pin into the locating bore and pressing the annular faces against one another, characterized in that the outer cone or the inner cone of at least one of the holding elements has two substantially frustoconical contact portions arranged coaxially at an axial distance from one another having different cone angles which, during the clamping operation with the clamping bolts, are effective either individually or at one and the same time, wherein the inner cone and/or outer cone of the clamping bolts has two substantially frustoconical contact portions arranged coaxially at an axial distance from one another, with different cone angles, only one of which, in each case, complements one of the contact portions of the neighboring outer cone or inner cone of one of the holding elements, or the inner cone and/or the outer cone of the clamping bolts has only one substantially frustoconical contact portion, which complements one of the contact portions of the neighboring outer cone or inner cone of one of the holding elements, or the inner cone and/or the outer cone of the clamping bolts has two substantially frustoconical contact portions arranged coaxially at an axial distance from one another, both of which complement one of the contact portions of the neighboring outer cone or inner cone of one of the holding elements.

44. The device as claimed in claim 43, characterized in that the contact portions, arranged at an axial distance from one another, of the clamping bolt and of the holding elements have a cone angle that becomes greater toward the respectively free end face.

45. The device as claimed in claim 43, characterized in that the substantially frustoconical contact portions of the clamping bolt and/or of the holding elements have a slightly curved lateral surface in the axial direction.

46. The device as claimed in claim 43, characterized in that the contact portions of the clamping bolt and of the holding elements are delimited at the surrounding peripheries thereof by, in each case, a substantially frustoconical peripheral portion.

47. The device as claimed in claim 46, characterized in that the peripheral portions have a lateral surface that is crowned or curved in a flute-like manner in the axial direction.

48. The device as claimed in claim 43, characterized in that one of the holding elements is formed as a stop screw that is fixed on the second component and the other holding element is formed as a movement screw that can be actuated during the clamping operation, and in that the substantially frustoconical contact portions complementing one another have a smaller cone angle on the side of the stop screw than on the side of the movement screw.

49. The device as claimed in claim 48, characterized in that the holding element that is formed as a movement screw has an outer cone and the clamping bolt on the side of the movement screw has an inner cone complementing said outer cone with only one substantially frustoconical contact portion.

50. The device as claimed in claim 48, characterized in that the holding element that is formed as a stop screw has an inner cone and the clamping bolt on the side of the stop screw has an outer cone with, in each case, two substantially frustoconical contact portions arranged at an axial distance from one another, with different cone angles.

51. The device as claimed in claim 48, characterized in that the holding element that is formed as a stop screw has a flange-like countersunk head which is delimited by a circular outer periphery and has a stop cone and an elevation, which is arranged at an axial distance within the outer periphery, delimits a central polygonal socket and the highest point of which in the assembled state is arranged within the cylindrical lateral circumference of the second component.

52. The device as claimed in claim 51, characterized in that the elevation has a substantially frustoconical shape and is arranged concentrically in relation to the outer periphery.

53. The device as claimed in claim 43, characterized in that the movement screw and/or the stop screw has a sawtooth thread with a flat supporting flank and cylindrical guiding surface portions.

54. The device as claimed in claim 43, characterized in that the movement screw and/or the stop screw has a trapezoidal thread with cylindrical guiding surface portions.

55. The device as claimed in claim 43, characterized in that the clamping bolt and/or the holding elements have, at least in the region of the inner and/or outer cones, a friction-reducing coating or surface finish.

56. The device as claimed in claim 43, characterized in that the clamping bolt of the clamping mechanism has a slot-like aperture which communicates with axially central coolant channels in the two components either directly or indirectly by way of a coolant pipe passing through.

57. The device as claimed in claim 43, characterized in that a radial groove is provided in the second component in the region of the annular faces and a sliding block complementing the radial groove is provided in the first component (10), said groove and said block engaging exactly with one another in the assembled state, thereby producing a torque transfer.

58. The device as claimed in claim 43, characterized in that a sealing ring, provided with an axial aperture, and a centering ring, supported on the inner wall of the locating bore, are arranged between the end face of the locating pin and the bottom of the locating bore.

59. The device as claimed in claim 58, characterized in that the sealing ring and the centering ring are connected to one another in one piece.

* * * * *